United States Patent
El Naga et al.

(10) Patent No.: US 11,433,557 B2
(45) Date of Patent: Sep. 6, 2022

(54) BUFFER BLOCK APPARATUSES AND SUPPORTING APPARATUSES

(71) Applicant: DIVERGENT TECHNOLOGIES, INC., Los Angeles, CA (US)

(72) Inventors: Eahab Nagi El Naga, Los Angeles, CA (US); Keith Allen Fleming, Los Angeles, CA (US); Matthew Cooper Keller, Los Angeles, CA (US); Lukas Philip Czinger, Los Angeles, CA (US); Chukwubuikem Marcel Okoli, Los Angeles, CA (US); Michael Thomas Kenworthy, Los Angeles, CA (US); Matthew Coleman Tindall, Los Angeles, CA (US); Justin David Almeleh, Los Angeles, CA (US); Matthew Michael O'Brien, Los Angeles, CA (US); Broc William TenHouten, Los Angeles, CA (US); Oussama Rawas, Los Angeles, CA (US); Juan Cuauhtemoc Munoz, Los Angeles, CA (US); Muhammad Faizan Zafar, Los Angeles, CA (US); Jamison Van Bruch, Los Angeles, CA (US); Thomas Samuel Bowden, Jr., Los Angeles, CA (US); Alex James Hamade, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 96 days.

(21) Appl. No.: 16/553,017

(22) Filed: Aug. 27, 2019

(65) Prior Publication Data
US 2020/0070365 A1   Mar. 5, 2020

Related U.S. Application Data

(60) Provisional application No. 62/724,002, filed on Aug. 28, 2018.

(51) Int. Cl.
*B25J 15/10* (2006.01)
*B33Y 80/00* (2015.01)

(52) U.S. Cl.
CPC .............. *B25J 15/10* (2013.01); *B33Y 80/00* (2014.12)

(58) Field of Classification Search
CPC .......... B25J 15/10; B33Y 80/00; B22F 10/20; Y02P 10/25
See application file for complete search history.

(56) References Cited

U.S. PATENT DOCUMENTS 5,203,226 A   4/1993   Hongou et al.
5,742,385 A   4/1998   Champa
(Continued)

FOREIGN PATENT DOCUMENTS

CN   108115253 A   6/2018
EP   2724813 A1    4/2014
(Continued)

OTHER PUBLICATIONS

US 9,202,136 B2, 12/2015, Schmidt et al. (withdrawn)
(Continued)

*Primary Examiner* — Stephen A Vu
(74) *Attorney, Agent, or Firm* — ArentFox Schiff LLP

(57) ABSTRACT

A buffer block apparatus for securing a node may be described. The buffer block apparatus may include a first surface having disposed thereon at least one first zero-point feature configured for a first zero-point interface with a robotic assembly apparatus; and a second surface, different from the first surface, configured to connect with a first surface of a node and form a first rigid connection between the buffer block apparatus and the node, wherein the buffer block apparatus provides at least one reference coordinate system with respect to the node.

20 Claims, 23 Drawing Sheets

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,914,957 B2 | 12/2014 | Park et al. |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Fen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,419 B1 * | 1/2017 | Strauss ................ B25J 9/1065 |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,581,983 B2 | 2/2017 | Kilibarda et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Garni et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |

(56) References Cited

U.S. PATENT DOCUMENTS

| | | |
|---|---|---|
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |

(56) References Cited

U.S. PATENT DOCUMENTS

| | | |
|---|---|---|
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2004/0056405 A1 | 3/2004 | Ghuman et al. |
| 2006/0108783 A1 | 5/2006 | Ni et al. |
| 2014/0277669 A1 | 9/2014 | Nardi et al. |
| 2015/0019013 A1* | 1/2015 | Rose ............... B25J 15/10 700/258 |
| 2015/0336271 A1 | 11/2015 | Spicer et al. |
| 2016/0052142 A1* | 2/2016 | Ekas ............... B25J 15/08 294/106 |
| 2016/0089793 A1* | 3/2016 | Truebenbach ..... G01R 31/2896 324/750.25 |
| 2016/0136820 A1* | 5/2016 | Lessing ............ B25J 15/12 294/208 |
| 2017/0050277 A1 | 2/2017 | Shi et al. |
| 2017/0113344 A1 | 4/2017 | Schönberg |
| 2017/0341309 A1 | 11/2017 | Piepenbrock et al. |
| 2018/0208251 A1 | 7/2018 | Miller et al. |

FOREIGN PATENT DOCUMENTS

| | | |
|---|---|---|
| EP | 2778992 A1 | 9/2014 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)

US 10,449,880 B2, 10/2019, Mizobata et al. (withdrawn)

International Search Report & Written Opinion received in PCT/US2019/048617 dated Jan. 2, 2020.

Jorge Corona-Gastuera et al.,; "An Approach for Intelligent Fixtureless Assembly: Issues and Experiments;" A. Gelbukh, A. de Albornoz, and H. Terashima (Eds ): MICAI 2005, LNAI 3789, pp. 1052-1061, 2005. © Springer-Verlag Berlin Heidelberg 2005.

Bone, G. and Capson D., "Vision-Guided fixtureless Assembly of Automotive Components", Robotics and Computer Integrated Manufacturing, vol. 19, pp. 79-87, 2003. DOI: 10.1016/S0736-5845(02)00064-9.

Ogun, P. et al., 2015. "3D Vision Assisted Flexible Robotic Assembly of Machine Components." IN: Proceedings of 2015 8th International Conference on Machine Vision (ICMV2015), Barcelona, spain, Nov. 19-21, 2015 (Proceedings of SPIE, 9878, DOI: 10.1117/12.2229053).

James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. IEEE International Conference on Robotics and Automation 0-7803-1965-6/95 $4.00 © 1995 IEEE.

Invitation to Pay Additional Fees received in PCT/US2019/048617 dated Oct. 22, 2019.

European Search Report issued for European Patent Application No. 20209019.7, dated Apr. 20, 2021, 11 pages.

Supplementary Partial European Search Report received in corresponding European Patent Application No. 19853889.4, dated Jul. 15, 2022.

* cited by examiner

BUFFER BLOCK APPARATUSES AND SUPPORTING APPARATUSES

CROSS REFERENCE TO RELATED APPLICATION(S)

This application claims the benefit of U.S. Provisional Application Ser. No. 62/724,002, entitled "BUFFER BLOCK APPARATUSES AND SUPPORTING APPARATUSES" and filed on Aug. 28, 2018, which is expressly incorporated by reference herein in its entirety.

BACKGROUND

Field

The present disclosure relates to transport structures such as automobiles, trucks, trains, boats, aircraft, motorcycles, metro systems, and the like, and more specifically to techniques for securing nodes for various processes.

Background

A transport structure such as an automobile, truck or aircraft employs a large number of interior and exterior nodes. These nodes provide structure to the automobile, truck and aircraft, and respond appropriately to the many different types of forces that are generated or that result from various actions like accelerating and braking. These nodes also provide support. Nodes of varying sizes and geometries may be integrated in a transport structure, for example, to provide an interface between panels, extrusions, and/or other structures. Thus, nodes are an integral part of transport structures.

Most nodes must be coupled to, or interface securely with, another part or structure in secure, well-designed ways. In order to securely connect a node with another part or structure, the node may need to undergo one or more processes in order to prepare the node to connect with the other part or structure. For example, the node may be machined at an interface in order to connect with various other parts or structures. Further examples of processes include surface preparation operations, heat treatment, electrocoating, electroplating, anodization, chemical etching, cleaning, support removal, powder removal, and so forth.

In order to perform the various processes on the node, the node may be securely fixed in a position, e.g., so that a mill may machine the interface of the node at a precise location. When the node is unsecured and/or the position of the node is inaccurate during one or more of the aforementioned processes, the node may be erroneously and irreparably altered (e.g., through machining). Further, because a number of different processes may be performed on the node, the position of the node should be reproducibly obtainable. Thus, a need exists for an approach to consistently positioning a node with a high degree of precision before, during, and/or after performing various processes on the node.

SUMMARY

The present disclosure generally relates to additively manufactured nodes in an environment (e.g., a production environment) for various operations (e.g., machining and assembly). Because additively manufactured nodes may appreciably vary in geometry, a repeatable approach to attachment and detachment with the node for the various operations may improve securing different nodes for the various operations. Such an approach may include a reusable apparatus or assembly that may not necessarily be incorporated into (e.g., additively manufactured with) the node.

An example of such an apparatus may be a buffer block. A buffer block many enable a plurality of additively manufactured nodes with different geometries to be picked up and utilized in assembly processes and/or post-processing operations. The coordinate axis of the buffer block may be constant and, therefore, the buffer block may serve as a reference point (e.g., reference coordinate system) for a plurality of nodes undergoing various operations. In so doing, the buffer block may reduce or eliminate the need for custom fixturing that is dependent on the geometry of the node (e.g., custom features that are additively manufactured on the node for scanning or probing the node before machining).

Example 1 of the present disclosure may include a buffer block apparatus for securing a node, the buffer block apparatus comprising: a first surface having disposed thereon at least one first feature configured for a first interface with a robotic assembly apparatus, the at least one first feature being highly accurate and repeatable and the at least one first interface being highly accurate and repeatable; and a second surface, different from the first surface, configured to connect with a first surface of a node and form a first rigid connection between the buffer block apparatus and the node, wherein the buffer block apparatus provides at least one reference coordinate system with respect to the node. In example 2, the buffer block apparatus of example 1 may include the second surface of the buffer block apparatus directly connected with the first surface of the node. In example 3, the buffer block apparatus of example 1 may include the second surface of the buffer block apparatus connected with the first surface of the node through at least one interface apparatus that is disposed between the second surface of the buffer block apparatus and the first surface of the node.

In example 4, the buffer block apparatus of example 1 may include the at least one first feature is a zero-point feature and the first interface is a zero-point interface. In example 5, the buffer block apparatus of example 1 may include a third surface of the buffer block apparatus connected with a first surface of a supporting apparatus and forming a second rigid connection between the buffer block apparatus and the supporting apparatus.

In example 6, the buffer block apparatus of example 1 may include the first surface of the supporting apparatus bounding a first recess in which at least a portion of the buffer block apparatus is disposed, and the first surface of the buffer block apparatus facing away from the first surface of the supporting apparatus.

In example 7, the buffer block apparatus of example 6 may include the buffer block apparatus including a first plurality of fingers extending from the first surface of the buffer block apparatus, the first plurality of fingers being configured to engage with one or more surfaces of the node to form the first rigid connection between the buffer block apparatus and the node, the supporting apparatus including a first plurality of pogo pins extending from the first surface of the supporting apparatus outside of the first recess, and the first plurality of pogo pins connecting with the one or more surfaces of the node.

In example 7, the buffer block apparatus of example 6 may include the first surface of the buffer block apparatus including a first set of features configured to engage with a second set of features included on one or more surfaces of the node, the engagement of the first set of features included on the first surface of the buffer block apparatus with the second set of features included on the one or more surfaces of the node forming a zero-point interface between the buffer block apparatus and the node, the supporting apparatus including a first plurality of support features extending from the first surface of the supporting apparatus outside of the first recess, and the first plurality of support features connecting with the one or more surfaces of the node proximate to a first plurality of locations on the first node at which the first node is to be machined.

In example 9, the buffer block apparatus of example 1 may include the first surface of the buffer block apparatus including a first plurality of programmable fingers extending away from the first surface of the buffer block apparatus, each programmable finger of the first plurality of programmable fingers configured to be independently actuated to a respective position of a plurality of positions inclusively between a fully open position and a fully closed position, and the first plurality of programmable fingers configured to engage with a first plurality of receiving features included on one or more surfaces of the node to form the first rigid connection.

In example 10, the buffer block apparatus of example 1 may include the buffer block apparatus comprising a build plate having a center portion that is divided into a plurality of sections proximate to a center of the build plate, each first surface of each section of the plurality of sections including a respective support feature extending away from each first surface of each section of the plurality of sections, the each respective support feature connected with a respective surface of the node to form the first rigid connection.

In example 11, the buffer block apparatus of example 10 may include a distal end of the each respective support feature is connected with a first surface of a respective interface plate that is angled toward the node, and each of the respective interface plates connects with the respective surface of the node. In example 12, the buffer block apparatus of example 10 may include the build plate comprising a second portion surrounding the center portion of the build plate, and the build plate is unconnected with the node from the second portion surrounding the center portion.

In example 13, the buffer block apparatus of example 1 may include the first surface of the buffer block apparatus including a plurality of cavities, a respective support feature extending from each cavity of the plurality of cavities, and a respective distal end of each of the respective support features is configured to be connected with the node by a respective bolt that connects with a respective tab of a plurality of tabs included on one or more surfaces of the node. In example 14, the buffer block apparatus of example 1 may include the first surface of the buffer block apparatus including a plurality of pins extending away from the first surface of the buffer block apparatus, and each pin of the plurality of pins is configured to be received by a respective receiving feature disposed on a respective surface of the node to form a zero-point interface between the buffer block and the node. In example 15, the buffer block apparatus of example 1 may include the first surface of the buffer block apparatus including a channel configured to have a bolt disposed therein, a threaded portion of the bolt extending away from the first surface of the buffer block apparatus and outside of the channel, the threads of the bolt configured to be received by a threaded cavity of the node, and the first surface of the buffer block includes a first hole disposed at a first side of the channel and a second hole disposed at a second side of the channel, the first hole configured to receive a first pin disposed on the first surface of the node, and the second hole configured to receive a second pin disposed on the first surface of the node. In example 16, the buffer block apparatus of example 1 may include the first surface of the buffer block apparatus including a plurality of fingers extending away from the first surface of the buffer block apparatus, the plurality of fingers are configured to connect with one or more surfaces of the node, and a third surface of the buffer block apparatus includes a screw configured to actuate the plurality of fingers to form the first rigid connection in response to force applied to the screw. In example 17, the buffer block apparatus of example 1 may include the second surface of the buffer block apparatus being connected with a first surface of a connection assembly configured to interface with one or more surfaces of the node via a plurality of fingers disposed on a plurality of surfaces of the connection assembly different from the first surface of the connection assembly, and the buffer block apparatus includes an actuation mechanism configured to actuate the plurality of fingers forming the first rigid connection.

In example 18, the buffer block apparatus of example 17 may include the actuation mechanism comprising at least one channel disposed on a third surface of the buffer block apparatus, wherein the at least one channel is configured to carry an injectable substance to the connection assembly to actuate the plurality of fingers, and the actuated plurality of fingers forming the first rigid connection. In example 19, the buffer block apparatus of example 18 may include the injectable substance comprising at least one of air or hydraulic fluid. In example 20, the buffer block apparatus of example 17 may include the second surface of the buffer block apparatus is connected with an interface plate disposed between the first surface of the buffer block apparatus and the first surface of the connection assembly. In example 21, the buffer block apparatus of example 18 may include the at least one channel being configured to carry the injectable substance to the connection assembly to cause the actuated plurality of fingers to remain actuated to maintain the first rigid connection.

Example 22 of the present disclosure may be a supporting apparatus for securing a node provided to the supporting apparatus by a robotic assembly apparatus, the supporting apparatus comprising: a compliance pedestal having at least a first surface and a second surface, wherein the first surface of the compliance pedestal is configured to be connected with a base of a machining apparatus; a compliance unit having at least a first surface and a second surface, wherein the first surface of the compliance unit is configured to be connected with the second surface of the compliance pedestal; an adaptive unit having at least a first surface and a second surface, wherein the first surface of the adaptive unit is configured to be connected with the second surface of the compliance unit; and a gripper unit having at least a first surface and a second surface, wherein the first surface of the gripper unit is configured to be connected with the second surface of the adaptive unit, wherein: the gripper unit includes a first finger extending away from the second surface of the gripper unit that is configured to be actuated to apply pressure to a first surface of a node, the adaptive unit includes a second finger extending away from the second surface of the adaptive unit that contacts a second surface of the node, and the supporting apparatus configured to provide translational compliance and rotational compliance in response to the pressure applied by the first finger to reduce deflection of the node. In example 23, the supporting apparatus of example 22 may include at least one of the compliance pedestal or the compliance unit being configured to provide the translation compliance.

In example 24, the supporting apparatus of example 22 may include at least one of the adaptive unit or the gripper unit being configured to provide the rotational compliance. In example 25, the supporting apparatus of example 24 may include the at least one of the adaptive unit or the gripper unit including a ball joint to provide the rotational compliance. In example 26, the supporting apparatus of example 22 may include a third surface of the node is connected with a buffer block apparatus provides at least one reference coordinate system with respect to the node, the buffer block apparatus further connected with a robotic assembly apparatus, and a combination of the supporting apparatus and buffer block apparatus securing the node for one or more assembly operations.

Example 27 of the present disclosure may be a method of securing a node for machining, the method comprising: attaching a buffer block apparatus to at least a first surface of a node; connecting, by a first robotic assembly apparatus, with the node via a first zero-point interface between the buffer block apparatus and the first robotic assembly apparatus; determining at least one reference coordinate system based on the buffer block apparatus; determining at least one translation matrix based on the at least one reference coordinate system; and positioning, by the first robotic assembly apparatus, the node based on the at least one translation matrix. In example 28, the method of example 27 may include the determining the at least one reference coordinate system based on the buffer block apparatus comprising at least one of: scanning, separately from the node, the buffer block apparatus to obtain the at least one reference coordinate system; or probing, separately from the node, the buffer block apparatus to obtain the at least one reference coordinate system. In example 29, the method of example 28 may include the determining the at least one translation matrix based on the at least one reference coordinate system comprising at least one of: scanning, after scanning the buffer block apparatus, one or more identification features of the node to obtain a position of the node with respect to the at least one reference coordinate system; or probing, after probing the buffer block apparatus, the one or more identification features of the node to obtain the position of the node with respect to the at least one reference coordinate system, wherein the at least one translation matrix is based on the obtained position of the node with respect to the at least one reference coordinate system. In example 30, the method of example 27 may include machining at least one interface feature of the node after the positioning the node; releasing, by the first robotic assembly apparatus, the node after the machining; and connecting, by a second robotic assembly apparatus, with the node via a second zero-point interface between the buffer block apparatus and the second robotic assembly apparatus.

It will be understood that other aspects of mechanisms for realizing adhesive connections with additively manufactured components and the manufacture thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

DETAILED DESCRIPTION

Figure 1:
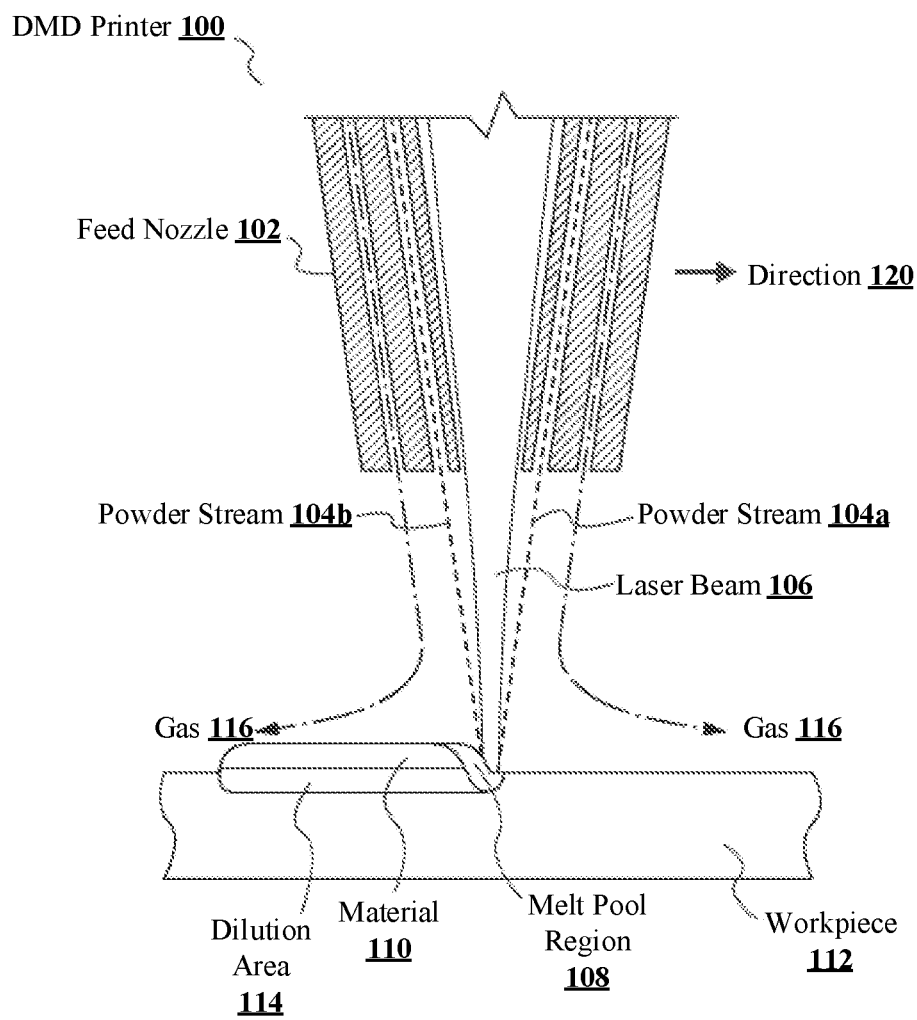
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

Additive Manufacturing (3-D Printing). Additive manufacturing (AM) is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104*a* and 104*b* into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
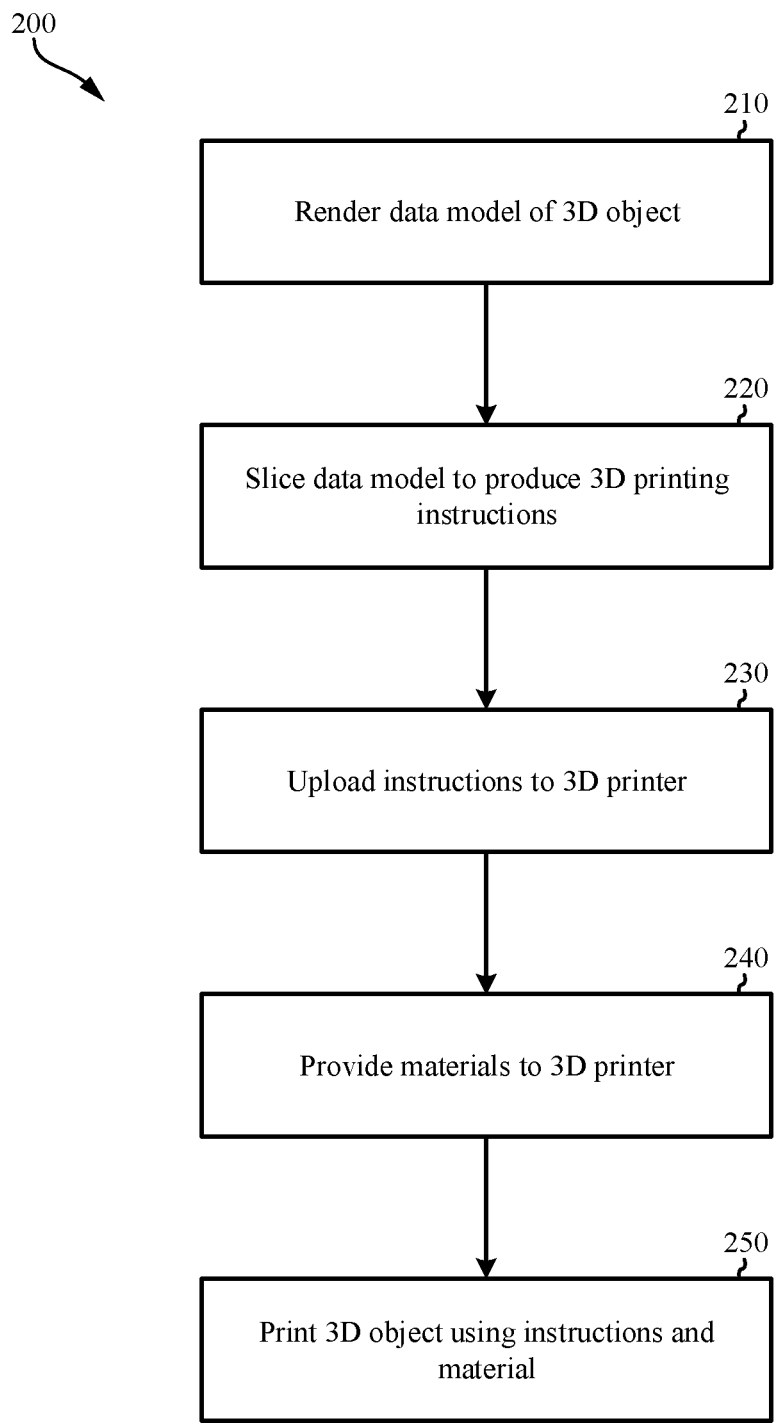
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modeling, as described above, parts are printed by applying successive layers of model and support materials to a substrate. In general, any suitable 3-D printing technology may be employed for purposes of this disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
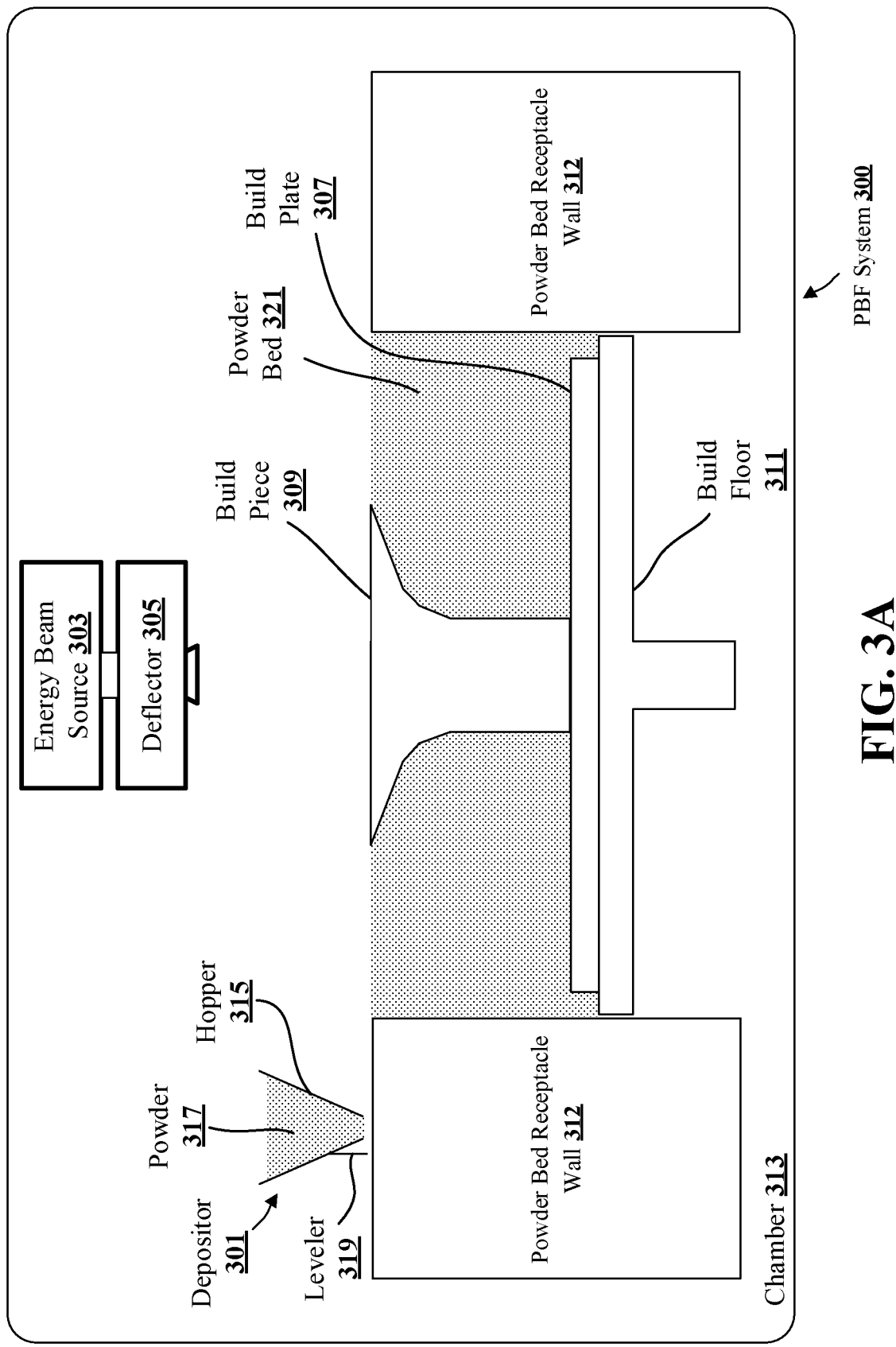
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
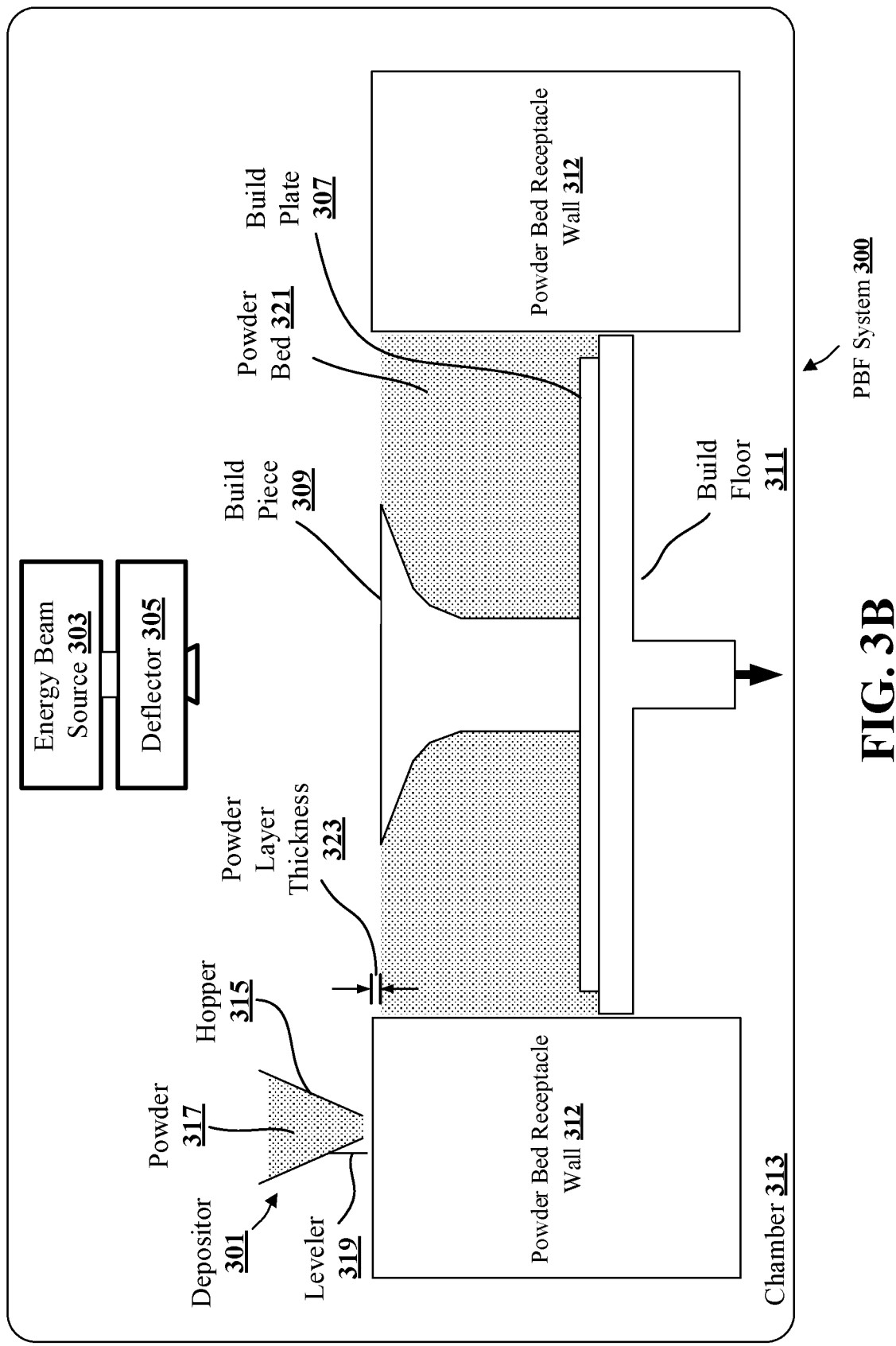

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
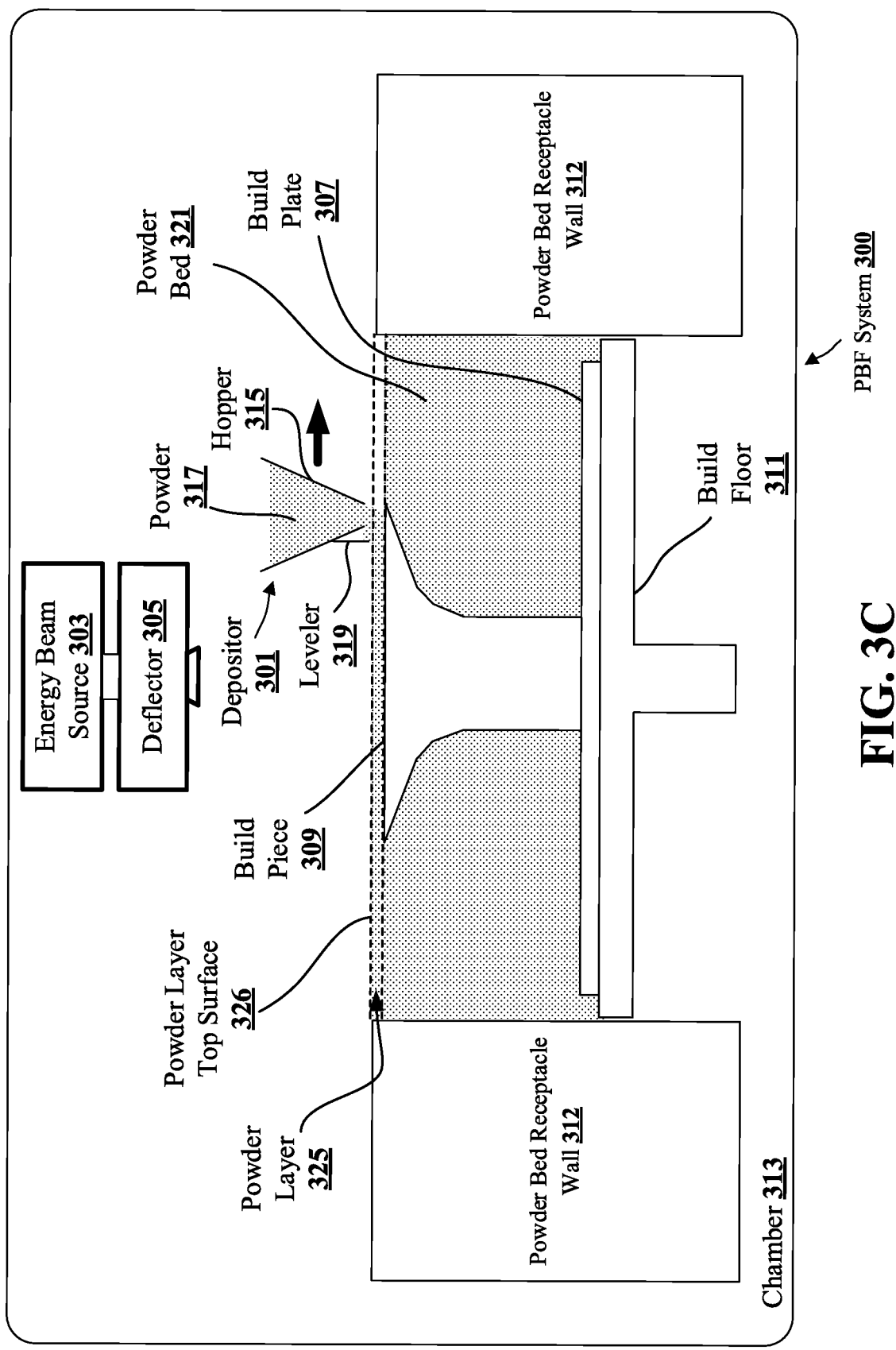

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
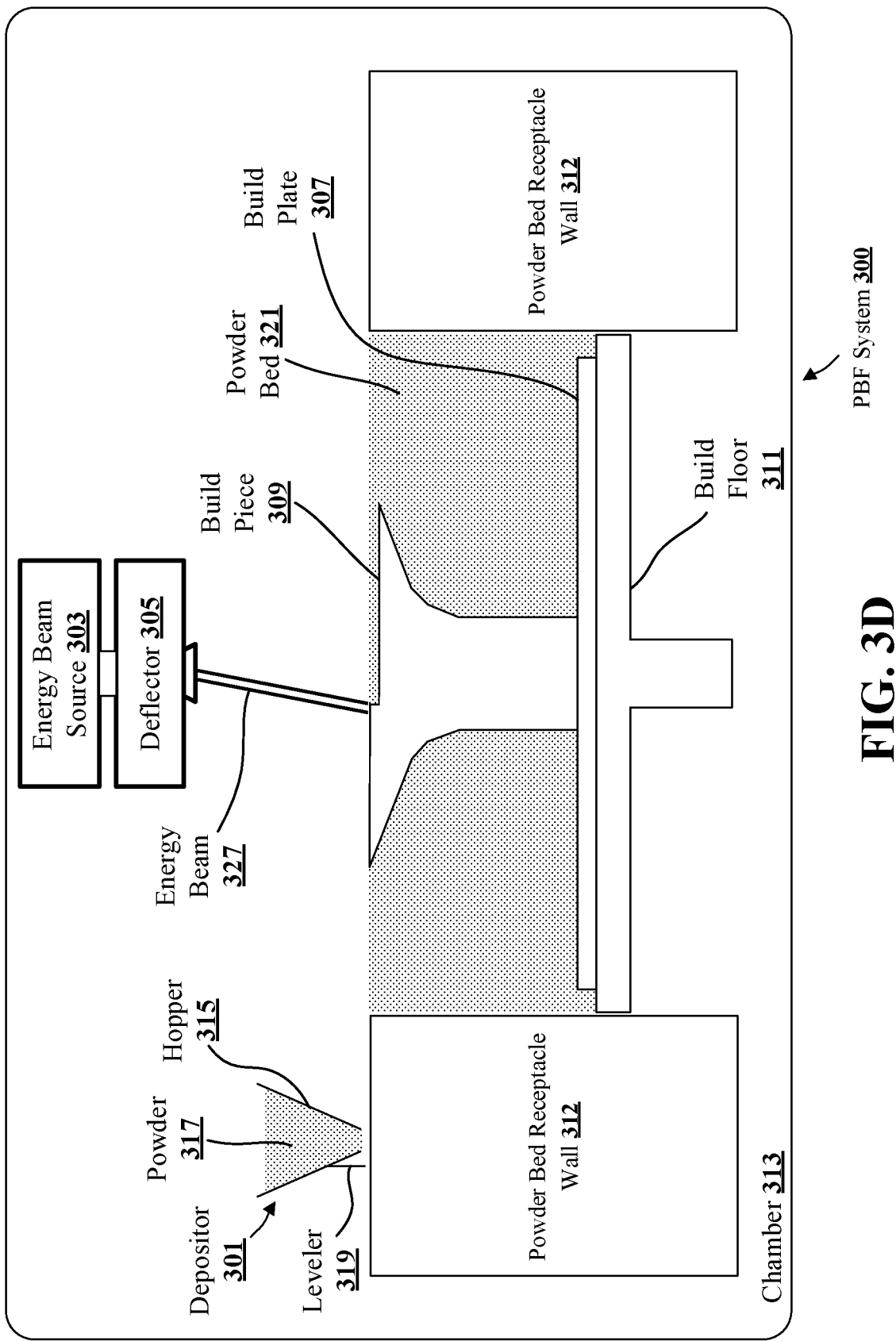

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

This disclosure presents a technique for securing a node to perform one or more assembly processes and/or post-processing operations. Examples of assembly processes and/or post-processing operations include machining, surface preparation operations, heat treatment, electrocoating, electroplating, anodization, chemical etching, part cleaning, support removal, powder removal, and other operations. To better facilitate assembly, the node may be printed in two or more parts, with the two or more parts being fastened mechanically prior to sealing and/or injection. In an exemplary embodiment, the node may constitute a base structure with sides protruding from the base structure to define a recess for accepting a structure. In other embodiments, the node may constitute additional features, such as connection features to other structures or other structural or functional features that are not explicitly shown in the illustrations herein to avoid unduly obscuring the concepts of the disclosure and to focus on the node-structure interface aspect of the node. These additional features of the node may cause portions of the node to take a different shape or may add structures and geometrical features that are not present in the illustrations herein. These additional features and structures may be additively manufactured along with the remainder of the node, although this may not necessarily be the case, as in some applications, traditional manufacturing techniques such as casting or machining may be used.

In various embodiments, a buffer block may be used to interface with a node. For example, the buffer block may provide an approach to connecting with a node by a robotic assembly and/or other automated constructor during various operations of the assembly processes and/or post-processing operations. The buffer block may provide a repeatable approach to connecting with (e.g., picking up) one or more additively manufactured nodes, such as different nodes of different geometries.

Further, the buffer block may provide a repeatable approach to connecting with (e.g., picking up) the same node at different times during the assembly processes and/or post-processing operations (e.g., during machining, during electrocoating, etc.). In particular, the buffer block may facilitate handoff of the node between different robotic assemblies and/or other machines. That is, the buffer block may enable a plurality of nodes to be held in an assembly environment, and the buffer block may reduce or eliminate the need for node-specific fixturing. For example, with a buffer block described in the present disclosure, the need for printing and/or installing custom fixtures on each node may be reduced or eliminated by the universality of the buffer block. In another example, the need for node-specific tooling and/or effectors may be reduced and/or eliminated. As described in the present disclosure, a buffer block may be implemented in a variety of embodiments.

A buffer block may include at least one feature that is configured to interface with tool changers, effectors, or other mechanisms of a robotic assembly and/or other automated constructor. Such features may be disposed on different surfaces of the buffer block. Further, the buffer block may include a plurality of interfaces, each of which may be configured to interface with a plurality of tools implemented by a robotic assembly and/or other automated constructor. Thus, the buffer block may enable a node to traverse assembly processes and/or post-processing operations in which different tools are utilized by different robotic assemblies and/or automated constructors.

In one aspect, the buffer block may be configured for a zero-point interface with a robotic assembly and/or other automated constructor, e.g., so that the robotic assembly and/or other automated constructor may connect with the buffer block and node before, during, and/or after assembly processes, post-processing operations, and/or installation of the node into the transport structure (e.g., chassis). A robotic assembly and/or other automated constructor may move and position a node and buffer block assembly before, during, and/or after assembly processes, post-processing operations, and/or installation of the node into the transport structure.

The connection between the buffer block and the robotic assembly or other automated constructor may be a rigid connection (e.g., as opposed to a compliant connection). A rigid connection may include a connection through which the node is prevented from rotation and translation in each of six degrees of freedom—e.g., any rotation or translation of the node relative to the buffer block may not exceed a threshold amount of microns, for example, that may be less than one millimeter or one tenth of a millimeter.

An interface may be highly accurate and repeatable, for example, in connection with one or more features that are highly accurate and repeatable. In an aspect, a highly accurate and repeatable interface may be a zero-point interface, which may provide a rigid connection that prevents rotation and translation of the buffer block in each of six degrees of freedom. A zero-point interface may be enabled through one or more highly accurate and repeatable features (e.g., zero-point features), which may be included on and/or installed on the buffer block.

An example of a zero-point interface includes a 3-2-1 locking mechanism, in which a first zero-point feature enables locking three degrees of freedom, a second zero-point feature enables locking two degrees of freedom, and a third zero-point feature enables locking one degree of freedom. Thus, each of six degrees of freedom may be locked, e.g., when a robotic assembly and/or other automated constructor engages with each of the first, second, and third zero-point features (e.g., male features of the robotic assembly and/or other automated constructor may "mate" with female zero-point features of the buffer block).

A zero-point interface may not over-constrain rotation and/or translation of the buffer block relative to a robotic assembly and/or other automated constructor. In particular, two zero-point features of the buffer block may not be used to constrain the same degree of freedom. For example, each zero-point feature of the buffer block may constrain the buffer block on at least one plane and, therefore, each zero-point feature may constrain rotation or translation of the buffer block in at least one plane that is different from each of the other planes constrained by another zero-point feature.

A buffer block may connect with a node at a first surface of the buffer block that is different from the one or more surfaces at which the buffer block interfaces with a robotic assembly and/or other automated constructor. At the first surface of the buffer block, the buffer block may be directly connected with node and/or the buffer block may connect with the node through one or more interface apparatuses, such as an interface plate, a clamp, a grabber, and/or another technique described herein. In some embodiments, an interface apparatus may be a custom manufactured assembly.

An interface apparatus may be configured to engage with the node to pick up the node, maintain the connection with the node, and release the node as needed. Pursuant thereto, a buffer block may include one or more channels, valves, and the like that allow for an injectable substance (e.g., air, hydraulic fluid, etc.) to be routed to an interface apparatus so that the interface apparatus may be actuated (e.g., as finger grabbers, clamps, and so forth are to be actuated). Alternatively or additionally, an interface apparatus may be actuated and/or maintained in an engaged configuration through one or more springs.

In some embodiments, a robotic assembly, automated constructor, and/or other machine may provide commands that cause introduction of an injectable substance and actuation of an interface apparatus. In one example, a robotic assembly connected with the buffer block may approach a node with a gripper positioned toward the node in a retracted position and, once the gripper contacts the node, the robotic assembly may issue a command to actuate (e.g., extend) the gripper and secure (e.g., grab) the node.

In some embodiments, the node may include (e.g., may be printed with) one or more features and/or surfaces that provide sufficient grip or traction to enable the connection with the buffer block. Examples of sufficient grip or traction may include texturing of one or more surfaces or the node, female receiver features included on the node, tabs included on the node, or another feature that ensures the connection with the buffer block is preserved. For example, the node may be printed with three features to interface with a three-finger gripper. In one example, the one or more features of the node may be printed or included on a same plane. Depending on the geometry of the node, some features of the node may be printed on bosses. By printing features of the node on bosses, a gripper (e.g., 3-finger gripper) may connect the buffer block with the node.

In aspects, the buffer block may connect with a node to form a rigid connection. The rigid connection may prevent the node from rotational and/or translational movement, e.g., at a micron level. A rigid connection between the node and the buffer block may prevent any rotation and translation of the node in all six degrees of freedom relative to the buffer block. For example, a rigid connection may constrain rotation and translation of the node relative to the buffer block to be within a threshold amount of microns, e.g., that may be less than one millimeter or one tenth of a millimeter.

In some embodiments, a zero-point interface may provide the rigid connection that prevents rotation and translation of the node relative to the buffer block in each of six degrees of freedom. A zero-point interface may be enabled through one or more zero-point features, which may be included on (e.g., printed on) and/or installed on the node and/or the buffer block. An example of a zero-point interface includes a 3-2-1 locking mechanism. For example, male features of the buffer block may "mate" with female zero-point features of the node. In addition, the zero-point interface may not over-constrain rotation and/or translation of the node relative to the buffer block (e.g., each zero-point feature may constrain rotation or translation of the node in at least one plane that is different from each of the other planes constrained by another zero-point feature).

The buffer block may convey reference information (e.g., an origin, a reference coordinate system, reference frame, etc.) to a robotic assembly, other automated constructor, and/or other machine (e.g., CNC machine) with respect to the node. Thus, the buffer block may be a precision-engineered apparatus. Such a robotic assembly, automated constructor, and/or other machine may use the reference frame provided by the buffer block before, during, and/or after manipulation of the node through assembly processes and/or post-processing operations. For example, a translation matrix may be generated based on the reference information in order to obtain the position of the node.

The buffer block may be at least as robust as a node to which the buffer block is connected. That is, the buffer block may withstand different processes of the assembly processes and/or post-processing operations. For example, the buffer block may be configured to withstand one or more of machining, surface preparation, heat treatment, heat coating, electrocoating, electroplating, anodization, chemical etching, cleaning, etc. In aspects, the buffer block is able to form a rigid connection with the node during all of these assembly and/or post-processing operations.

In some embodiments, the buffer block may be contemporaneously connected with both a robotic assembly or other automated constructor and the node (e.g., during machining or other assembly/post-processing operation). For example, a CNC mill may serve as a base for a robotic assembly and the buffer block (simultaneously connected with the robotic assembly and the node) may be connected with both the robotic assembly and the node. Accordingly, the robotic assembly may provide the requisite force(s) to prevent or minimize displacement of the node during machining or other assembly/post-processing operations.

Further to the present disclosure, a node may be secured with a supporting apparatus, embodiments of which may or may not include a buffer block. The supporting apparatus may retain the node, e.g., during machining or other assembly/post-processing operations. Thus, the supporting apparatus may prevent or minimize displacement and/or deflection of the node during such operations.

In some embodiments, the supporting apparatus may be referred to as a block dock, such as when the buffer block is present in certain embodiments that include the supporting apparatus. The supporting apparatus may provide an interface to the buffer block and form a rigid connection.

According to some embodiments, the supporting apparatus may include a compliance unit to which a clamping system is affixed. The clamping system may include a fixed arm and an actuated arm. In one example, a robotic assembly may move a node connected with a buffer block to the supporting apparatus, e.g., so that a portion of the node contacts the fixed arm. Once the fixed arm interfaces with the node and buffer block assembly (e.g., at a portion of the node), the actuated arm may be actuated to clamp the node in position. The compliance unit of the supporting apparatus may prevent movement (e.g., deflection, displacement, etc.) of the node while the clamping action is performed. That is, the compliance unit may allow the supporting apparatus to move in one or more of six degrees of freedom (e.g., three rotational degrees of freedom).

In another embodiment, the clamping system may provide compliance in one or more of six degrees of freedom (e.g., three rotational degrees of freedom). In such an embodiment, the compliance unit may enable the supporting apparatus to be free-floating when the clamping action is performed, but may become fixed when the clamping action is complete. That is, once clamping is achieved, the compliance unit may become rigid. Additionally, the node, buffer block, and/or robotic assembly (or other automated constructor) may also be rigidly connected.

After the rigid connection(s) are achieved, various assembly and/or post-processing operations may be performed. The node may be repositioned (e.g., reoriented) as needed to enable access to other features (e.g., joints, through holes, tabs, slabs, etc.) that are to undergo other assembly/post-processing operations.

Further, the supporting apparatus may be connected with the node, e.g., near regions of the node that are machined so that those regions are supported during various assembly processes (e.g., machining, etc.) and/or post-processing operations. The connection with the node may be rigid, compliant, or a combination—e.g., the connection with the node may begin as compliant, and later become rigid. For example, a compliant connection with the node may be beneficial to prevent deflection of the relative fine interfaces of the node during machining.

In some embodiments, the node may include one or more supporting features, which may be configured to interface with the supporting apparatus. Such supporting features may be co-printed (e.g., additively manufactured) with the node and/or may be installed on the node after printing. An example of a supporting feature may include an interface for a spherical support interface whereby the supporting apparatus connects with the node.

As described in the present disclosure, the supporting apparatus may be unconnected with the buffer block. According to some embodiments, the support apparatus may connect with the node at a zero-point interface, e.g., at a zero-point feature that is included on the node. A robotic assembly, automated constructor, and/or other machine may connect with the node at another zero-point interface. The buffer block may be absent. In another embodiment, a node may be connected with a buffer block at first (e.g., to position the node on a table) and, after the node is positioned and secured with a supporting apparatus, the buffer block may be removed or the robotic assembly may be detached from the buffer block.

The present disclosure provides various different embodiments of supporting and/or securing nodes for assembly processes and/or post-processing operations. It will be appreciated that various embodiments described herein may be practiced together. For example, an embodiment described with respect to one illustration of the present disclosure may be implemented in another embodiment described with respect to another illustration of the present disclosure.

Figure 4:
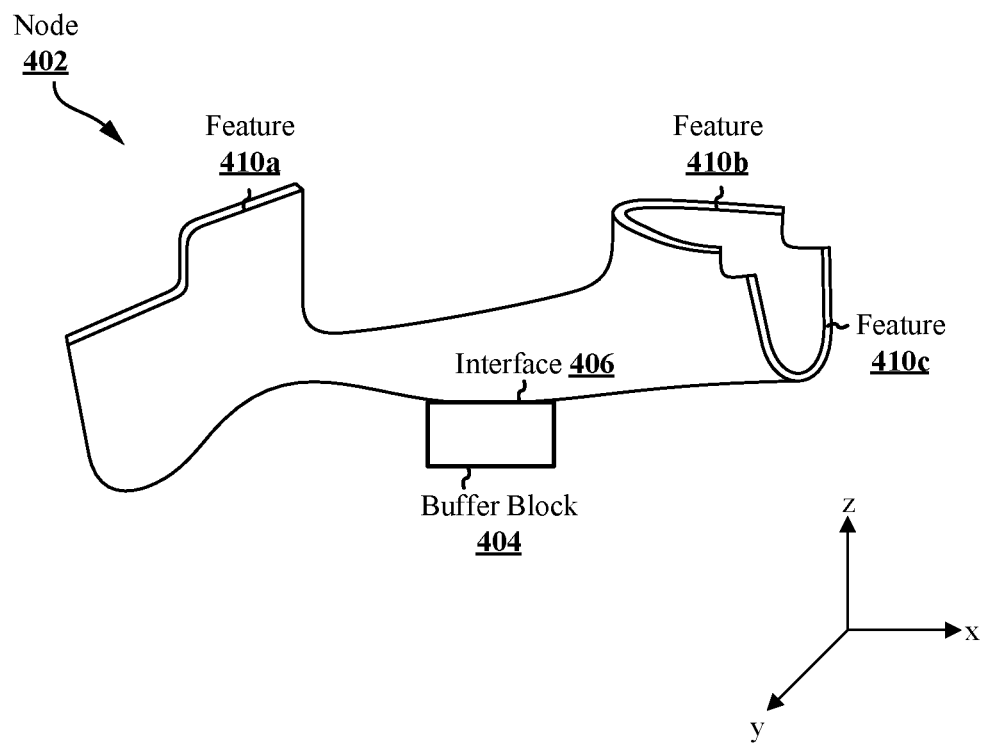
FIG. 4 illustrates a perspective of a node.

FIG. 4 illustrates a perspective view 400 of a node 402 having a plurality of features 410a-c and a buffer block 404. In an exemplary embodiment, the node 402 is additively manufactured (e.g., using a 3-D printing apparatus, such as a PBF apparatus). The node 402 may be constructed from a plastic, metal, alloy, or any suitable material or combination thereof. The components of FIG. 4 are made transparent for clarity, although the components may or may not be partially or fully transparent in various applications.

The node 402 may be additively manufactured on a build plate, which may be affixed to the node 402 when the node is removed from the 3-D printing apparatus. After removal from the 3-D printing apparatus, the build plate may be removed from the node 402.

The node 402 may be printed with one or more support structures. These support structures may additionally be removed from the node 402, e.g., before, during, or after one or more assembly processes and/or post-processing operations on the features 410a-c.

A buffer block 404 may be connected with the node 402. The connection with between the buffer block 404 and the node 402 may be a rigid connection (e.g., as opposed to a compliant connection). The buffer block 404 may be connected with the node at an interface 406. In one embodiment, the interface 406 is a zero-point interface.

In one embodiment, the buffer block 404 may be connected to the node 402 with a gripper, jaw, clamp, or other connection mechanism, which may interface with the node 402 and fully constrain the node 402 relative to the buffer block 404 (e.g., to form a rigid connection). In one embodiment, the buffer block 404 may be connected with the node 402 via an interface plate at the interface 406. Such embodiments may be described in more detail, infra.

After the buffer block is scanned or probed, the node 402 may be scanned or probed (e.g., with contact or non-contact metrology). The relationship of the buffer block 404 with respect to the node 402 may be determined by this metrology operation with the node 402. In an embodiment, the node 402 may be printed with one or more identification features, which may be scanned or probed to determine a position of the node 402. In an embodiment, the node 402 may be additively manufactured with excess material to account for the tolerance stack-up between the node 402 and the buffer block 404; the excess material may be machined off the node 402 to ensure that the node 402 is in tolerance (e.g., with other nodes).

Transport structures may include a variety of different nodes, which may need to be machined or otherwise processed. Such processing may occur at features of a node, the locations of which may vary across different nodes. Accordingly, a flexible system to facilitate the accurate repeatability of assembly processes and/or post-processing operations across different nodes is needed, and may be provided by a buffer block 404.

The node 402 may include a plurality of features 410a-c. The plurality of features 410a-c may include portions or sections of the node 402 that are to undergo one or more assembly processes and/or post-processing operations (e.g., machining, cleaning, heat treatment, etc.). Examples of the features 410a-c include interfaces, joints, holes (e.g., rivet holes), slabs, bearing boards, and so forth. These features 410a-c may need to be precision engineered to be included in a transport structure. Accordingly, the features 410a-c may undergo one or more of the assembly processes and/or post-processing operations described herein, such as machining, surface preparation, heat treatment, electrocoating, electroplating, anodization, chemical etching, cleaning, support removal, powder removal, and/or other assembly processes and/or post-processing operations. Such assembly processes and/or post-processing operations may occur after the node 402 is printed with 3-D printing operations (e.g., as described, supra, with respect to one or more of FIGS. 1, 2, and/or 3A-D).

Because the features 410a-c may be precision engineered, a position of the node 402 on a table (e.g., mill table) should be known to a relatively high degree of accuracy (e.g., within microns). A robotic assembly (or other machine) may be attached to the buffer block 404 an position the buffer block 404 and node 402 on a table (e.g., within a CNC machine). The buffer block 404 may then be scanned or probed (e.g., with contact or non-contact metrology) to determine a position of the buffer block 404—this position of the buffer block 404 may serve as an origin, a reference coordinate system, or the like.

Figure 5A:
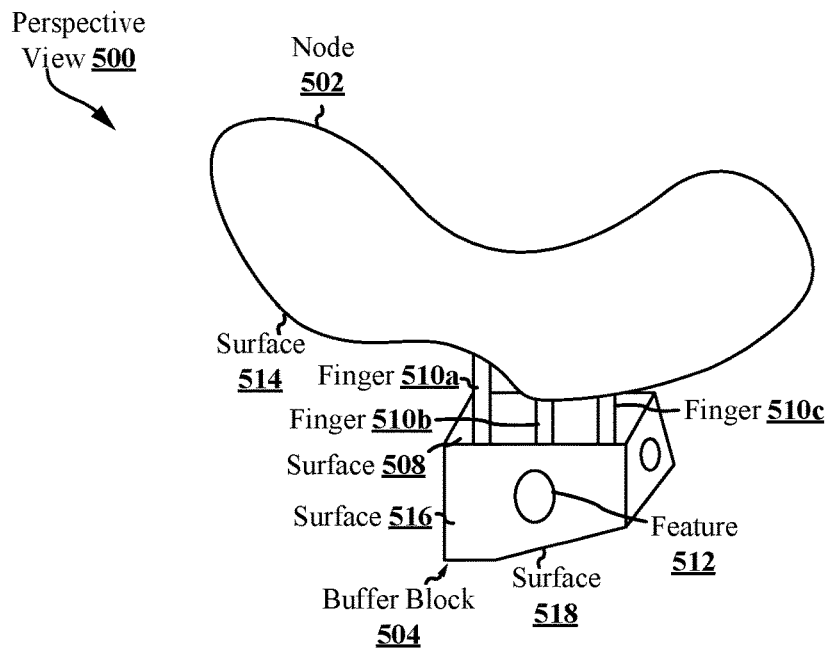
FIGS. 5A-B illustrate a node in connection with a buffer block.
Figure 5B:
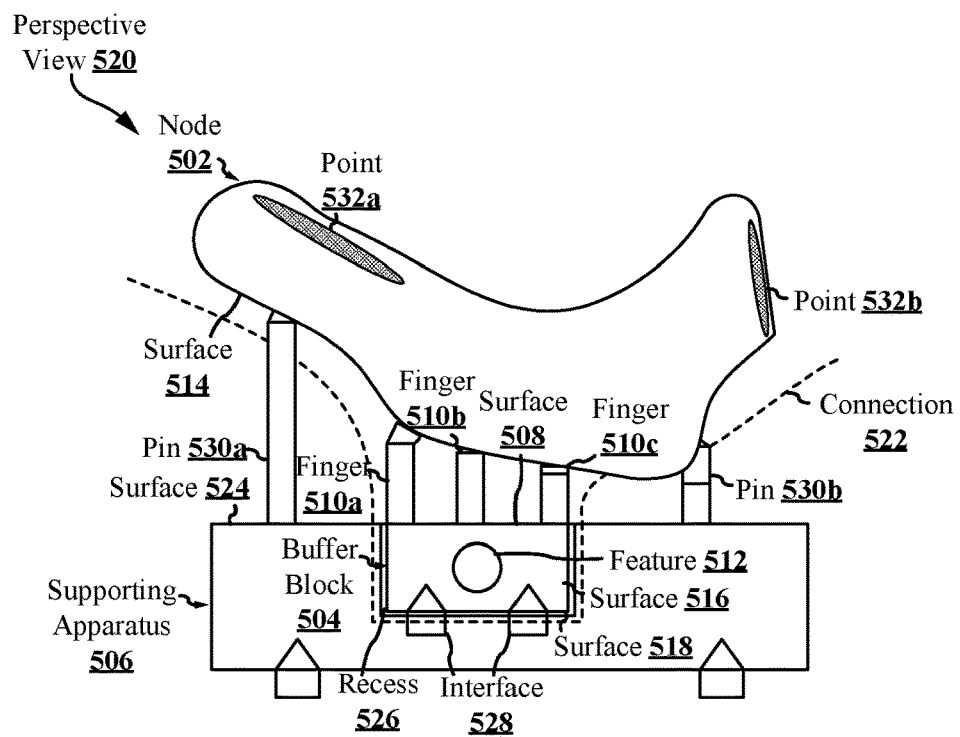

With reference to FIGS. 5A-B, perspective views 500, 520 illustrate a node 502 and a buffer block 504, with FIG. 5B including a supporting apparatus 506. In an exemplary embodiment, the node 502 is additively manufactured (e.g., using a 3-D printing apparatus, such as a PBF apparatus). The node 502 may be constructed from a plastic, metal, alloy, or any suitable material or combination thereof. The components of FIG. 5 are made transparent for clarity, although the components may or may not be partially or fully transparent in various applications. The node 502, the buffer block 504, and/or the supporting apparatus 506 may be embodiments of other node(s), buffer block(s), and/or supporting apparatuses, respectively, described in the present disclosure.

In FIG. 5A, the buffer block 504 may be connected with the node 502 to form a first rigid connection. The connection between the buffer block 504 and the node 502 may be a mechanical connection. The buffer block 504 may be connected with the node 502 in order to move with the part through one or more of the assembly processes and/or post-processing processes.

The buffer block 504 may be connected with the node 502 by a plurality of fingers 510a-c. For example, the plurality of fingers 510a-c may be an interface apparatus disposed between the buffer block 504 and the node 502 in order to form the rigid connection between the buffer block 504 and the node 502.

The plurality of fingers 510a may extend away from a first surface 508 of the buffer block 504. The plurality of fingers 510a-c may be configured to engage with one or more surfaces 514 of the node 502 to form the first rigid connection between the buffer block 504 and the node 502. In one embodiment, the plurality of fingers 510a-c may be configured to clamp and/or grip the one or more surfaces 514 of the node 502. Features may be disposed on the one or more surfaces of the node for interfacing with the fingers.

In various embodiments, a second surface 516, different from the first surface 508, of the buffer block 504 may include at least one zero-point feature 512. The at least one zero-point feature 512 may be configured for a zero-point interface with a robotic assembly, automated constructor, and/or other machine, e.g., in order to position the node 502 for one or more assembly processes and/or post-processing operations.

With reference to FIG. 5B, a supporting apparatus 506 is illustrated, in addition to the node 502 and the buffer block 504. In some embodiments, the supporting apparatus 506 may be referred to as a block dock. The supporting apparatus 506 may be configured to be connected with a table (e.g., a table of a mill, a table of a CNC machine, etc.).

The supporting apparatus 506 may include a first surface 524. The first surface 524 may bound a recess 526 formed in the supporting apparatus 506. The buffer block 504 may be at least partially disposed in the recess 526, with the first surface 508 of the buffer block 504 facing away from the recess 526 so that the plurality of fingers 510a-c may extend away from the recess 526 and engage with the one or more surfaces 514 of the node 502.

In some embodiments, at least a third surface 518 of the buffer block 504 may contact the first surface 524 of the supporting apparatus 506 within the recess 526. The third surface 518 of the buffer block 504 and the first surface 524 of the supporting apparatus 506 may be connected via at least one connection interface 528. The at least one connection interface 528 may form a rigid connection between the buffer block 504 and the supporting apparatus 506.

In one embodiment, the at least one connection interface 528 may include a zero-point interface. For example, the buffer block 504 may include one or more zero-point features with which the supporting apparatus 506 is configured to engage to form the zero-point interface of the connection interface 528.

According to the illustrated embodiment, the supporting apparatus 506 may include a plurality of pogo pins 530a-b. The plurality of pogo pins 530a-b may extend away from the first surface 524 of the supporting apparatus 506, e.g., at areas of the first surface 524 that are not forming the recess 526.

The plurality of pogo pins 530a-b may contact or connect with the one or more surfaces 514 of the node 502. For example, the plurality of pogo pins 530a-b may provide additional support for the node 502 during one or more assembly processes and/or post-processing operations.

The plurality of pogo pins 530a-b may contact the node 502 at one or more points of the node 502 that are proximate to one or more other points 532a-b of the node 502 that are to undergo assembly processes and/or post-processing operations. Accordingly, the plurality of pogo pins 530a-b may provide additional support and/or rigidity at those points 532a-b of the node 502 that are to undergo assembly processes and/or post-processing operations.

In some embodiments, the connection between the plurality of pogo pins 530a-b and the node 502 may be a tunable connection 522. That is, the tunable connection 522 between the plurality of pogo pins 530a-b and the node 502 may be compliant at some point in time, and rigid at another point in time. For example, at some point in time (e.g., when the node 502 and buffer block 504 assembly is being positioned to connect with the supporting apparatus 506), the connection between the plurality of pogo pins 530a-b and the node 502 may be at least partially compliant, e.g., so that the plurality of pogo pins 530a-b may adjust to the contours of the one or more surfaces 514 of the node 502. After the node 502 and buffer block 504 assembly is positioned to connect with the supporting apparatus 506, the connection between the plurality of pogo pins 530a-b and the node 502 may become rigid (e.g., the plurality of pogo pins 530a-b may be secured), which may provide the additional support and/or rigidity at those points 532a-b of the node 502 that are to undergo assembly processes and/or post-processing operations.

Figure 6:
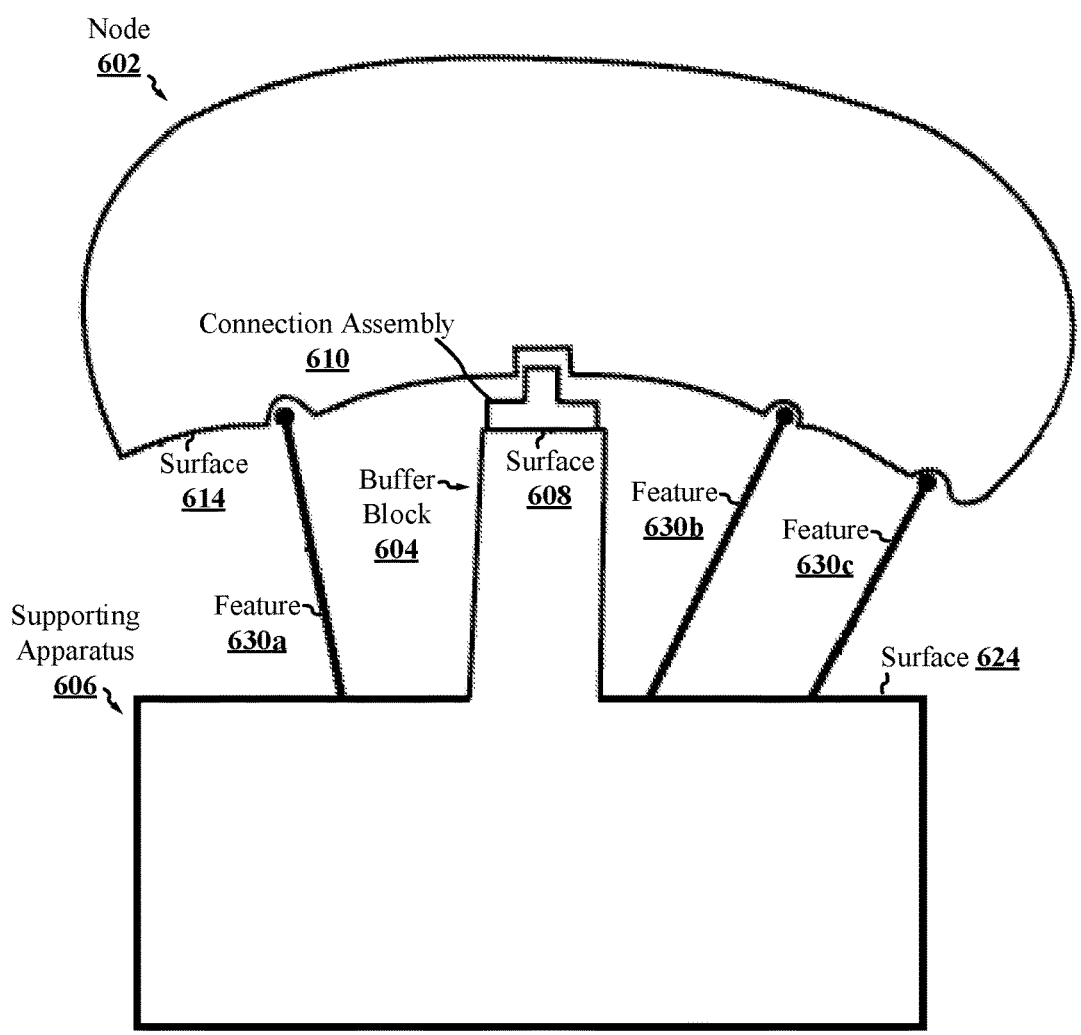
FIG. 6 illustrates a node in connection with a buffer block.

Referring now to FIG. 6, a perspective view 600 illustrates a node 602 and a buffer block 604, and including a supporting apparatus 606. In an exemplary embodiment, the node 602 is additively manufactured (e.g., using a 3-D printing apparatus, such as a PBF apparatus). The node 602 may be constructed from a plastic, metal, alloy, or any suitable material or combination thereof. The components of FIG. 6 are made transparent for clarity, although the components may or may not be partially or fully transparent in various applications. The node 602, the buffer block 604, and/or the supporting apparatus 606 may be embodiments of other node(s), buffer block(s), and/or supporting apparatuses, respectively, described in the present disclosure.

As illustrated, the buffer block 604 may be connected with the node 602 to form a first rigid connection. The buffer block 604 may be connected with the node 602 in order to move with the part through one or more of the assembly processes and/or post-processing processes.

The buffer block 604 may be connected with the node 602 by a first set of features that may be a connection assembly 610. For example, the connection assembly 610 may be an interface apparatus disposed between the buffer block 604 and the node 602 in order to form the rigid connection between the buffer block 604 and the node 602.

The connection assembly 610 may extend away from a first surface 608 of the buffer block 604. The connection assembly 610 may be configured to engage with one or more surfaces 614 of the node 602 to form the first rigid connection between the buffer block 604 and the node 602. In one embodiment, the connection assembly 610 may engage the one or more surfaces 614 of the node 602 as a zero-point interface between the node 602 and the buffer block 604.

In various embodiments, the connection assembly 610 may be configured to clamp and/or grip the one or more surfaces 614 of the node 602. For example, the connection assembly 610 may be a jaw, clamp, or gripper having a plurality of fingers or grippers configured to engage with the one or more surfaces 614 of the node 602. An example of the connection assembly 610 may be a 3-finger gripper or 3-finger clamp (although any number of fingers is comprehended by the present disclosure). According to one embodiment, the one or more surfaces of the node 602 may include a second set of features (e.g., female receiver features) that are configured to be engaged by the first set of features comprising the connection assembly 610 of the buffer block 604 (e.g., male features).

The buffer block 604 may connect with a supporting apparatus 606. In some embodiments, the supporting apparatus 606 may be referred to as a block dock. The supporting apparatus 606 may be configured to be connected with a table (e.g., a table of a mill, a table of a CNC machine, etc.).

The supporting apparatus 606 may include a first surface 624. For example, the buffer block 604 may be at least partially disposed in a recess formed by the first surface 624 of the supporting apparatus 606, with the first surface 608 of the buffer block 604 facing away from the recess so that the connection assembly 610 may extend away from the recess and engage with the one or more surfaces 614 of the node 602.

According to the illustrated embodiment, the supporting apparatus 606 may include a set of supporting features 630a-c. The set of supporting features 630a-c may extend away from the first surface 624 of the supporting apparatus 606, e.g., at areas of the first surface 624 that are not forming a recess.

The set of supporting features 630a-c may contact or connect with the one or more surfaces 614 of the node 602. For example, the set of supporting features 630a-c may provide additional support for the node 602 during one or more assembly processes and/or post-processing operations. In providing the additional support, the set of supporting features 630a-c may prevent deflection of the node 602, particularly at relatively thin or weak portions of the node (e.g., proximate to at least one point of the node 602 that is to undergo assembly processes and/or post-processing operations). This set of supporting features 630a-c may provide sufficient support of the node 602 during the assembly processes and/or post-processing operations.

At least one of the set of supporting features 630a-c may contact the node 602 at one or more points of the node 602 that are proximate to at least one point of the node 602 that is to undergo assembly processes and/or post-processing operations. Accordingly, the at least one of the set of features 630a-c may provide additional support and/or rigidity proximate to at least one point of the node 602 that is to undergo assembly processes and/or post-processing operations. In one aspect, the connection assembly 610 may form at least one zero-point interface with the node 602.

Figure 7:
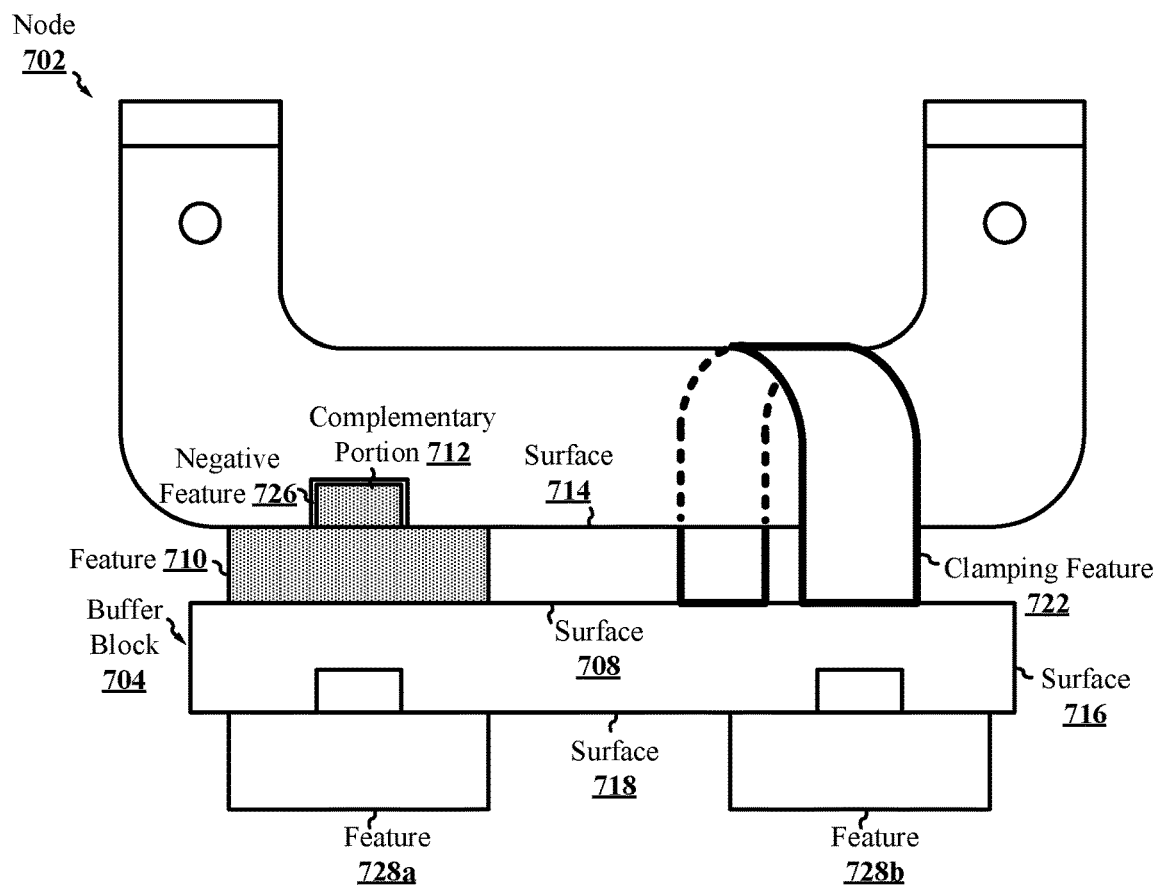
FIG. 7 illustrates a node in connection with a buffer block.

FIG. 7 shows a perspective view 700 of a node 702 and a buffer block 704. In an exemplary embodiment, the node 702 is additively manufactured (e.g., using a 3-D printing apparatus, such as a PBF apparatus). The node 702 may be additively manufacture for assembly. The node 702 may be constructed from a plastic, metal, alloy, or any suitable material or combination thereof. The components of FIG. 7 are made transparent for clarity, although the components may or may not be partially or fully transparent in various applications. The node 702 and/or the buffer block 704 may be embodiments of other node(s) and/or buffer block(s), respectively, described in the present disclosure. In some embodiments, a supporting apparatus may be additionally included, as described in the present disclosure.

As illustrated, the buffer block 704 may be connected with the node 702 to form a first rigid connection. The buffer block 704 may be connected with the node 702 in order to move with the part through one or more of the assembly processes and/or post-processing operations.

The buffer block 704 may include a first surface 708 that faces toward the node 702.

The buffer block 704 may include second surfaces 716, e.g., that may be approximately perpendicular to one or more surfaces 714 of the node 702 that face the buffer block 704. The buffer block 704 may include a third surface 718 that faces away from the node 702.

In various embodiments, the node 702 may be printed or machined to have a negative feature 726. For example, the negative feature 726 may be a recess that is bounded by the one or more surfaces 714 of the node 702.

The buffer block 704 may be designed with a complementary feature 710, having a portion 712 that is designed to be complementary to the negative feature 726. For example, the complementary feature 710 may be designed using computer-aided design (CAD), e.g., in which a volume enclosing the node 702 is designed and the negative feature 726 is determined to give the dimensions of the complementary portion 712 of the complementary feature 710.

The buffer block 704 may be configured with one or more features 728a-b to be engaged by a robotic assembly or other automated constructor. In one aspect, the one or more features 728a-b may be configured as zero-point features for a zero-point interface with the robotic assembly or other automated constructor.

The robotic assembly or other automated constructor may position the buffer block 704 so that the complementary portion 712 the complementary feature 710 is positioned within the negative feature 726 of the node 702 and thereby engage the negative feature 726 of the node 702. In various aspects, the engagement of the complementary feature 710 and the negative feature 726 may provide a zero-point interface between the buffer block 704 and the node 702. In various aspects, the buffer block 704 may be attached to the node 702 through one or more machining operations.

The buffer block 704 may include a clamping feature 722. The clamping feature 722 may be a soft jaw. The clamping feature 722 may be specific to the node 702. Therefore, different clamping features may be used for different nodes.

In one embodiment, the clamping feature 722 may be additively manufactured, e.g., so that the clamping feature 722 is composed of plastic. For example, the clamping feature 722 may be printed using a fused deposition modeling (FDM) printer or a stereolithography (SLA) printer. The clamping feature 722 may be designed using CAD, e.g., by designing a volume enclosing the node 702 and subtracting the volume wherever clamping is unnecessary.

The clamping feature 722 may provide sufficient retention and clamping during one or more assembly processes and/or post-processing operations. Further, the clamping feature 722 may be removed after one or more assembly processes and/or post-processing operations.

Figure 8A:
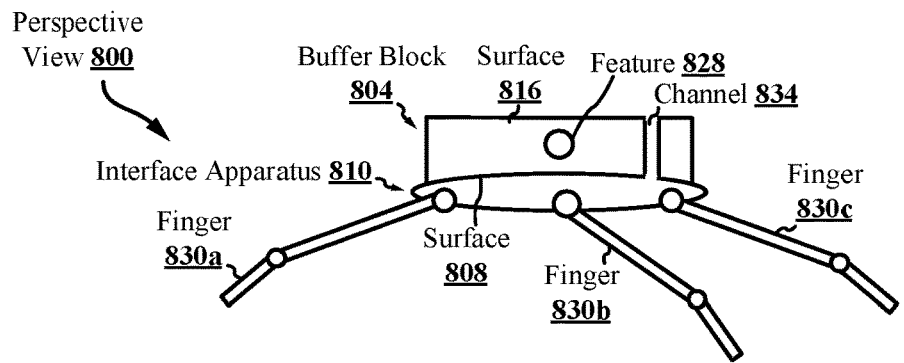
FIGS. 8A-C illustrate a node in connection with a buffer block.
Figure 8B:
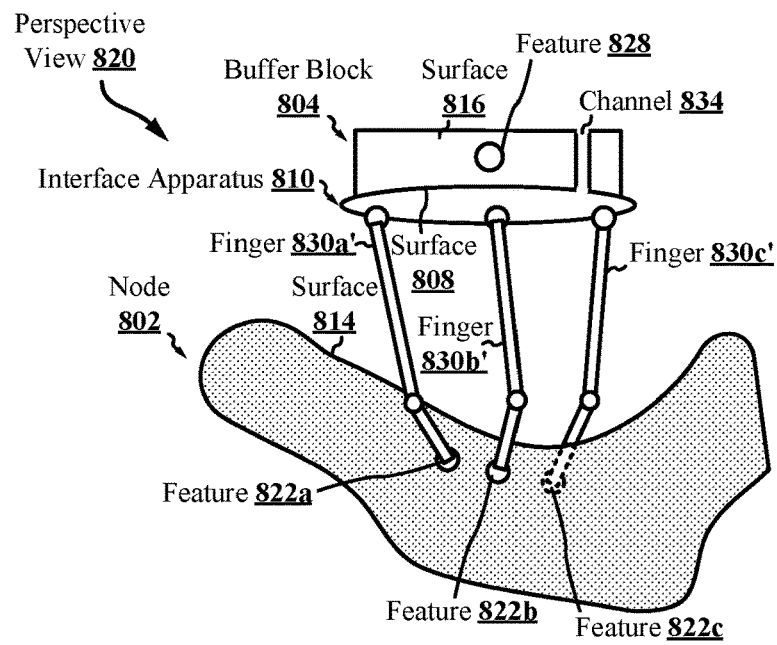
Figure 8C:
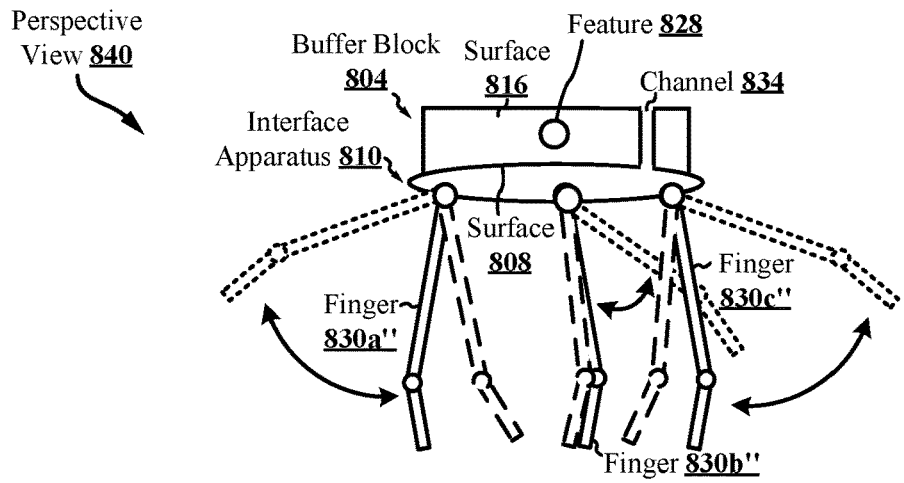

FIGS. 8A-C show perspective views 800, 820, 840 of a buffer block 804. The buffer block 804 may be configured to connect with a node 802, as illustrated with respect to FIG. 8B. In an exemplary embodiment, the node 802 is additively manufactured (e.g., using a 3-D printing apparatus, such as a PBF apparatus). The node 802 may be additively manufacture for assembly. The node 802 may be constructed from a plastic, metal, alloy, or any suitable material or combination thereof. The components of FIG. 8 are made transparent for clarity, although the components may or may not be partially or fully transparent in various applications. The node 802 and/or the buffer block 804 may be embodiments of other node(s) and/or buffer block(s), respectively, described in the present disclosure. In some embodiments, a supporting apparatus may be additionally included, as described in the present disclosure.

The buffer block 804 may be configured with one at least one feature 828 to be engaged by a robotic assembly or other automated constructor. The at least one feature 828 may be disposed on a second surface 816 of the buffer block 804 that is different from a first surface 808. According to various embodiments, the buffer block 804 may have a plurality of features, including the at least one feature 828, disposed thereon in order to connect with a plurality of different robotic assemblies and/or other automated constructors. Each of the plurality of features, including the at least one feature 828, may enable a different robotic assembly and/or other automated constructor to engage with the buffer block 804 to move the buffer block (and node, when attached thereto) throughout various assembly processes and/or post-processing operations. In one aspect, the at least one feature 828 may be configured as zero-point features for a zero-point interface with the robotic assembly or other automated constructor.

The buffer block 804 may be connected with an interface apparatus 810 at a first surface 808 of the buffer block 804. The interface apparatus 810 may be a gripper, jaw, clamp, or other similar tool having a plurality of fingers 830a-c. The plurality of fingers 830a-c may extend away from the first surface 808 of the buffer block 804, e.g., toward a node. Although the interface apparatus 810 is illustrated with three fingers, any number of fingers are comprehended by the present disclosure.

According to an embodiment, the interface apparatus 810 may be programmable. For example, interface apparatus 810 may be configured to receive a command issued by a robotic assembly and/or other automated constructor. The buffer block 804 may receive the command and provide the command to the interface apparatus 810. When the interface apparatus 810 receives a command, one or more of the fingers 830a-c may be accordingly actuated. A command may cause one or more of the fingers 830a-c to be locked in place, which may be spring-assisted to maintain the locked position. In various embodiments, commands may be provided by means of computer code that translates to actuation of one or more of the fingers 830a-c.

In some embodiments, the buffer block 804 may be configured with at least one channel 834. The at least one channel 834 may be configured to carry an injectable substance, such as air, hydraulic fluid, and the like. In one example, a plurality of injectable substances may be carried via the at least one channel 834 in order to actuate one or more of the fingers 830a-c, pursuant to a command.

In some embodiments, the plurality of fingers 830a-c may be spring-assisted. For example, the plurality of fingers 830a-c may be pneumatically actuated, and then spring-assisted to remain fully open (e.g., as illustrated in FIG. 8A) and/or spring-assisted to remain fully closed (e.g., as illustrated in FIG. 8B).

In one embodiment, the plurality of fingers 830a-c may radially move. In other embodiments, however, the plurality of fingers 830a-c may be configured to rotationally and/or telescopically move. The movement of the fingers 830a-c may be controlled via one or more commands issued by means of a robotic assembly and/or other automated constructor, and provided to the plurality of fingers 830a-c through the buffer block 804.

As shown in FIG. 8A, the fingers 830a-c may be in a first position. The first position may be a fully open position. In the fully open position, the interface apparatus 810 may be positioned by a robotic assembly and/or other automated constructor toward a node. In the fully open position, the interface apparatus 810 may be unengaged with a node.

As shown in FIG. 8B, the buffer block 804 may be connected with the node 802 to form a first rigid connection. The buffer block 804 may be connected with the node 802 in order to move with the part through one or more of the assembly processes and/or post-processing operations.

In order to connect with the node, the plurality of fingers 830a'-c' may be actuated to be in a fully closed position. For example, the plurality of fingers 830a-c may be actuated to move from the fully open position to the fully closed position of the plurality of fingers 830a'-c'.

In the fully closed position, the plurality of fingers 830a'-c' may engage with the node 802. The plurality of fingers 830a'-c' may engage with a plurality of features 822a-c disposed on at least one surface 814 of the node 802.

The plurality of features 822a-c may be printed on the node or may be machined on the node 802 after printing.

The plurality of features 822a-c may be configured to receive the plurality of fingers 830a'-c'. In the illustrated embodiment, the plurality of fingers 830a'-c' may be male features configured to "mate" with the female receiver features 822a-c of the node 802. When the plurality of fingers 830a'-c' engages with the plurality of features 822a-c of the node 802, a rigid connection may be formed between the buffer block 804 and the node 802.

As the plurality of fingers 830a-c are programmable, the plurality of fingers 830a-c may be independently actuated to any position inclusively between the fully open position of the fingers 830a-c and the fully closed position of the fingers 830a'-c'. In one embodiment, each of the plurality of fingers 830a-c may be independently actuated, e.g., so that each of the fingers 830a-c is able to be in a respective position that does not necessarily correspond with each of the other fingers 830a-c (e.g., one finger 830a may be in a fully open position while another finger 830b may be in a fully closed position). For example, each of the fingers 830a-c may be actuated to a respective angle, and each of the fingers 830a-c may not be equidistantly actuated.

As shown in FIG. 8C, the plurality of fingers 830a"-c" may be in an intermediary position. Any configuration of positions inclusively between the fully open position of the plurality of fingers 830a-c and the fully closed position of the fingers 830a'-c' may be possible. For example, the plurality of fingers 830a"-c" may be issued a command that actuates each of the plurality of fingers 830a"-c" to a respective intermediary position. Respective commands may be received to independently actuate each of the plurality of fingers 830a"-c" to an intermediary position. The plurality of fingers 830a"-c" may be spring-assisted to remain in the intermediary position.

Because the plurality of fingers 830a-c may be actuated to various positions, including the fully open fingers 830a-c, the fully closed fingers 830a'-c', and the exemplary intermediary fingers 830a"-c", a variety of different nodes of varying sizes and geometries may be engaged by the buffer block 804. For example, the plurality of fingers 830a-c may be issued a command to splay relatively wider to pick up nodes of larger sizes. Similarly, the fingers 830a'-c' may be issued a command to be fully closed in order to pick up nodes of a relatively small size. The plurality of fingers 830a"-c" may pick up nodes of various sizes between those relatively large and relatively small sizes by issuing commands commensurate with the sizes of the nodes.

In addition, the plurality of fingers 830a-c may pick up nodes of various geometries. For example, the plurality of fingers 830a"-c" in the intermediary position may be independently actuated to pick up nodes of various geometries, so that the plurality of fingers 830a"-c" each engage with features (e.g., features 822a-c) of a node. Accordingly, various intermediary positions of the plurality of fingers 830a"-c" may enable rigid connections with nodes of various sizes and/or various geometries for which the fully closed position of the fingers 830a'-c' may be unsuitable.

In various embodiments, a supporting apparatus may be absent. For example, the plurality of fingers 830a"-c" may form a rigid connection and allow a node to be held in sufficient proximity to a mill in order for the node to be machined while simultaneously preventing the node from rotational and/or translational movement that would be unacceptable for such machining operations.

Figure 9A:
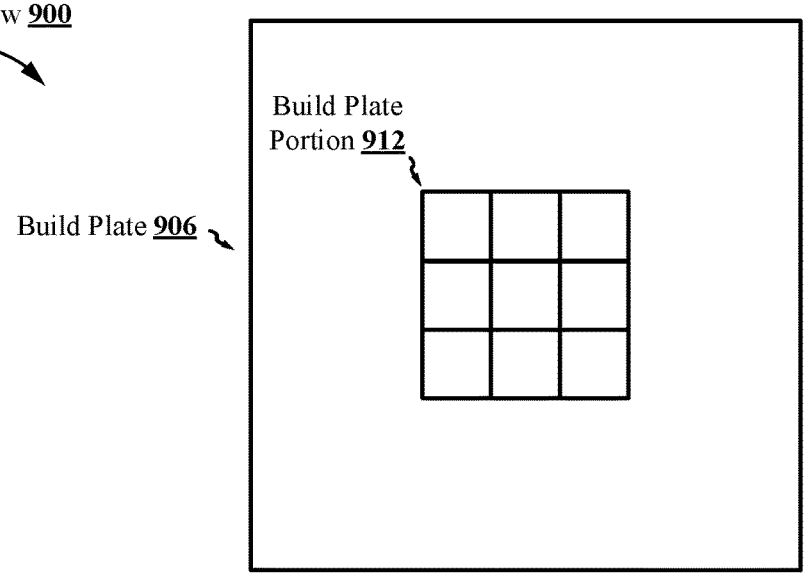
FIGS. 9A-B illustrate a node in connection with a buffer block.
Figure 9B:
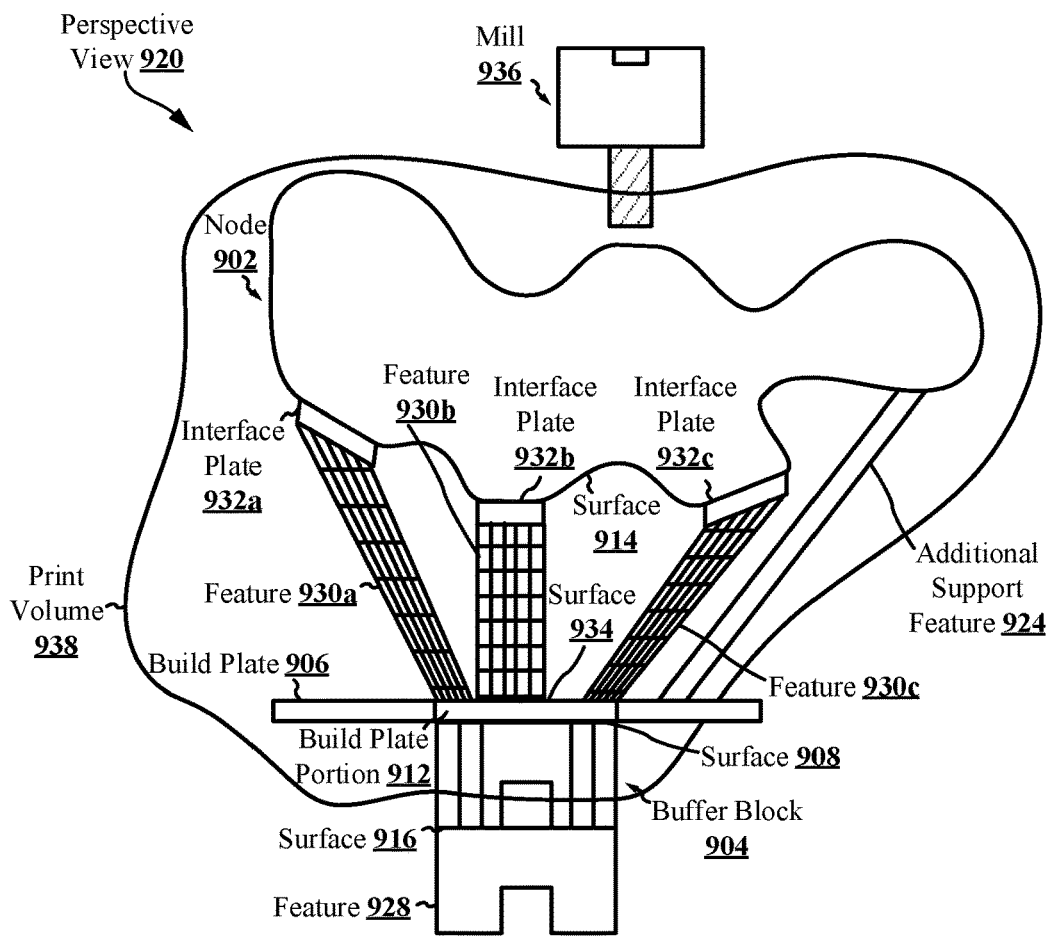

FIGS. 9A-B show perspective views 900, 920 of a buffer block 904. The buffer block 904 may be configured to connect with a node 902, as illustrated with respect to FIG. 9B.

FIG. 9A illustrates a build plate 906. A build plate 906 may be an area where a node is additively manufactured, e.g., within a print volume 938. The build plate 906 include a portion 912 that is divided into a plurality of sections, which may be proximate to a center of the build plate 906. In various aspects, the build plate 906 may be included on and/or may be configured to interface with a buffer block 904.

FIG. 9B illustrates a buffer block 904 connected with a node 902. The buffer block 904 may be configured with one at least one feature 928 to be engaged by a robotic assembly or other automated constructor. The at least one feature 928 may be disposed on a second surface 916 of the buffer block 904 that is different from a first surface 908. According to various embodiments, the buffer block 904 may have a plurality of features, including the at least one feature 928, disposed thereon in order to connect with a plurality of different robotic assemblies and/or other automated constructors. Each of the plurality of features, including the at least one feature 928, may enable a different robotic assembly and/or other automated constructor to engage with the buffer block 904 to move the buffer block (and node, when attached thereto) throughout various assembly processes and/or post-processing operations. In one aspect, the at least one feature 928 may be configured as zero-point features for a zero-point interface with the robotic assembly or other automated constructor.

The first surface 908 of the buffer block 904 may be connected with the node 902 through the build plate 906. The build plate 906 may include a portion 912 that is proximate to the center of the build plate and separated into sections (e.g., an array of build plates), as described with respect to FIG. 9A.

Each section of the portion 912 of the build plate 906 may include a first surface 934 that faces away from the buffer block 904. Each first surface 934 may have extending therefrom a respective support feature 930a-c. In some embodiments, the support features 930a-c may be printed on the portion 912 of the build plate 906, e.g., contemporaneously with the printing of the node 902.

A distal end of each support feature 930a-c may connect with the node 902. The support features 930a-c may connect with at least one surface 914 of the node 902 in order to form the rigid connection between the buffer block 904 and the node 902. The support features 930a-c may support thermal management, e.g., when the node 902 is machined by a mill 936.

In one embodiment, each distal end of each support feature 930a-c may connect with the at least one surface 914 of the node 902 through a respective interface plate 932a-c. Each respective interface plate 932a-c may be positioned on each respective support feature 930a-c to be angled toward the at least one surface 914 of the node 902 in order to connect with the at least one surface 914 of the node 902. In a further embodiment, additional support material may be disposed between each respective interface plate In one embodiment, the portion of the build plate 906 outside of the proximally center portion 912 may have one or more additional support features 924 extending therefrom. The one or more additional support features 924 may extend away from the first surface 908 of the buffer block 904 and contact the at least one surface 914 of the node 902, e.g., in order to provide additional support during assembly processes and/or post-processing operations.

In another embodiment, the one or more additional support features 924 may be absent, and only support features 930a-c extending from the proximally center portion 912 of the build plate 906 may contact the node 902. That is, the build plate 906 may be unconnected with the node 902 from a portion of the build plate 906 that surrounds the proximally center portion 912. However, the support features 930a-c may still provide a rigid connection between the buffer block 904 and the node 902.

Figure 10:
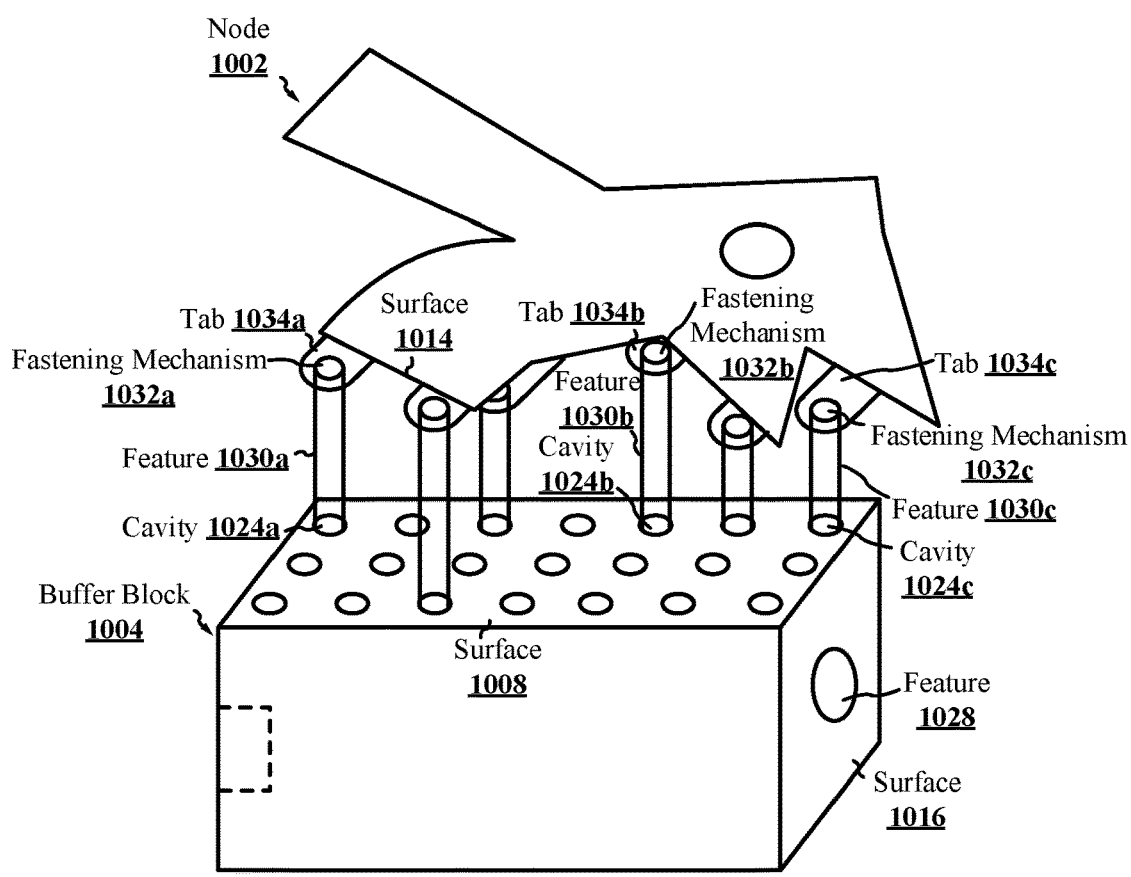
FIG. 10 illustrates a node in connection with a buffer block.

FIG. 10 shows a perspective view 1000 of a buffer block 1004. The buffer block 1004 may be configured to connect with a node 1002, as illustrated with respect to FIG. 10B. In an exemplary embodiment, the node 1002 is additively manufactured (e.g., using a 3-D printing apparatus, such as a PBF apparatus). The node 1002 may be additively manufacture for assembly. The node 1002 may be constructed from a plastic, metal, alloy, or any suitable material or combination thereof. The components of FIG. 10 are made transparent for clarity, although the components may or may not be partially or fully transparent in various applications. The node 1002 and/or the buffer block 1004 may be embodiments of other node(s) and/or buffer block(s), respectively, described in the present disclosure. In some embodiments, a supporting apparatus may be additionally included, as described in the present disclosure.

The buffer block 1004 may be configured with one at least one feature 1028 to be engaged by a robotic assembly or other automated constructor. The at least one feature 1028 may be disposed on a second surface 1016 of the buffer block 1004 that is different from a first surface 1008. According to various embodiments, the buffer block 1004 may have a plurality of features, including the at least one feature 1028, disposed thereon in order to connect with a plurality of different robotic assemblies and/or other automated constructors. Each of the plurality of features, including the at least one feature 1028, may enable a different robotic assembly and/or other automated constructor to engage with the buffer block 1004 to move the buffer block (and node, when attached thereto) throughout various assembly processes and/or post-processing operations. In one aspect, the at least one feature 1028 may be configured as zero-point features for a zero-point interface with the robotic assembly or other automated constructor.

In various embodiments, the node 1002 may include one or more surfaces 1014 having disposed thereon a plurality of tabs 1034a-c. Each of the plurality of tabs 1034a-c may be co-printed with the node 1002, or each of the plurality of tabs 1034a-c may be added after the node 1002 is additively manufactured. Each of the plurality of tabs 1034a-c may include a respective hole that is configured to receive a bolt, pin, screw, or other fastening mechanism. In one embodiment, each hole may be threaded.

The buffer block 1004 may have a first surface 1008 that includes a plurality of cavities 1024a-c. Each of the plurality of cavities 1024a-c may have disposed therein a respective support feature 1030a-c. Each respective support feature 1030a-c may extend out of a respective cavity 1024a-c, away from the first surface 1008 of the buffer block 1004 and toward the one or more surfaces 1014 of the node 1002.

A respective distal end of each of the support features 1030a-c may contact the node 1002 at a respective tab 1034a-c. A respective fastening mechanism 1032a-c (e.g., bolt, pin, screw, etc.) may be disposed through a respective hole of a respective tab 1034a-c and connect with a respective support feature 1030a-c, thereby securing the node 1002 to the buffer block 1004. The connection of each tab 1034*a-c* to each support feature 1030*a-c* by means of each fastening mechanism 1032*a-c* may provide a rigid connection between the buffer block 1004 and the node 1002.

Figure 11:
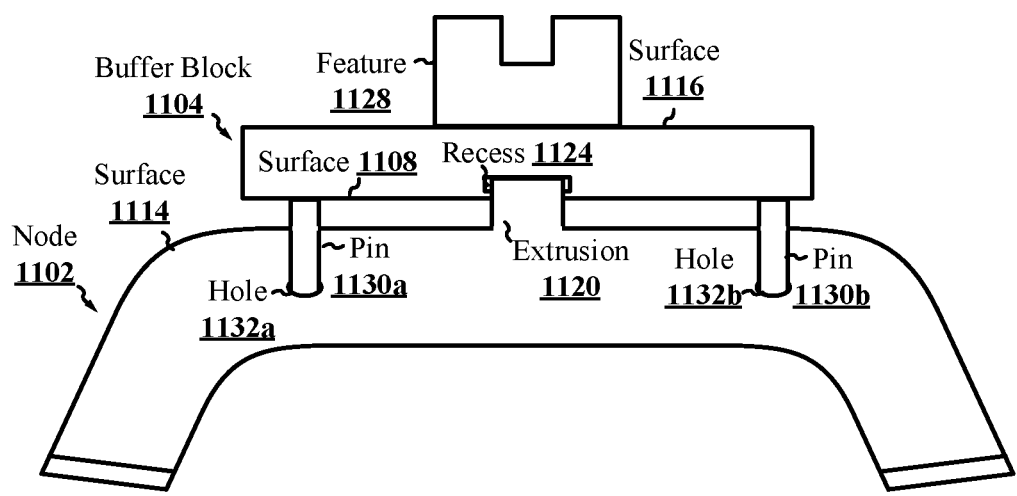
FIG. 11 illustrates a node in connection with a buffer block.

FIG. 11 shows a perspective view 1100 of a buffer block 1104. The buffer block 1104 may be configured to connect with a node 1102, as illustrated with respect to FIG. 11B. In an exemplary embodiment, the node 1102 is additively manufactured (e.g., using a 3-D printing apparatus, such as a PBF apparatus). For example, the node 1102 may be additively manufactured for assembly into a transport structure. The node 1102 may be constructed from a plastic, metal, alloy, or any suitable material or combination thereof. The components of FIG. 11 are made transparent for clarity, although the components may or may not be partially or fully transparent in various applications. The node 1102 and/or the buffer block 1104 may be embodiments of other node(s) and/or buffer block(s), respectively, described in the present disclosure. In some embodiments, a supporting apparatus may be additionally included, as described in the present disclosure.

The buffer block 1104 may be configured with one at least one feature 1128 to be engaged by a robotic assembly or other automated constructor. The at least one feature 1128 may be disposed on a second surface 1116 of the buffer block 1104 that is different from a first surface 1108. According to various embodiments, the buffer block 1104 may have a plurality of features, including the at least one feature 1128, disposed thereon in order to connect with a plurality of different robotic assemblies and/or other automated constructors. Each of the plurality of features, including the at least one feature 1128, may enable a different robotic assembly and/or other automated constructor to engage with the buffer block 1104 to move the buffer block (and node, when attached thereto) throughout various assembly processes and/or post-processing operations. In one aspect, the at least one feature 1128 may be configured as zero-point features for a zero-point interface with the robotic assembly or other automated constructor.

In various embodiments, the buffer block 1104 may connect with the node 1102 through a plurality of pins 1130*a-b* configured to be received by a plurality of holes 1132*a-b* disposed on the node 1102. The plurality of pins 1130 may be "male" features configured to "mate" with "female" receiving features (e.g., the plurality of holes 1132*a-b*) disposed on the node 1102.

In particular, the buffer block 1104 may include a plurality of pins 1130*a-b* that extend away from the first surface 1108 of the buffer block 1104. In correspondence, at least one surface 1114 of the node 1102 may include a plurality of holes 1132*a-b*. The plurality of holes 1132*a-b* may be printed on the node 1102 when the node 1102 is additively manufactured and/or the plurality of holes 1132*a-b* may be machined into the node 1102 after the node 1102 is printed. A respective one of the plurality of pins 1130*a-b* may be configured to be received by a respective one of the plurality of holes 1132*a-b*. When the plurality of pins 1130*a-b* are disposed in the plurality of holes 1132*a-b*, a rigid connection may be formed between the node 1102 and the buffer block 1104. In some aspects, the plurality of pins 1130*a-b* are disposed in the plurality of holes 1132*a-b* may be a zero-point interface.

According to an embodiment, the buffer block 1104 may further connect with the node 1102 through a recess 1124 configured to receive an extrusion 1120 disposed on the node 1102. For example, the buffer block 1104 may include recess 1124 that is at least partially bounded by the first surface 1108 of the buffer block 1104. Correspondingly, at least one surface 1114 of the node 1102 may have disposed thereon an extrusion 1120. The extrusion 1120 may be printed on the node 1102 when the node 1102 is additively manufactured and/or the extrusion 1120 may be attached to the node 1102 (e.g., using an adhesive substance) after the node 1102 is printed. The extrusion 1120 may be a negative of the recess 1124 having dimensions suitable to fit within the recess 1124. In addition to the plurality of pins 1130*a-b* positioned within the plurality of holes 1132*a-b*, the position of the extrusion 1120 within the recess 1124 may form the rigid connection between the node 1102 and the buffer block 1104. Further, the extrusion 1120 within the recess 1124 may be a zero-point interface between the node 1102 and the buffer block 1104—e.g., the extrusion 1120 may be a zero-point feature of the node 1102.

Figure 12:
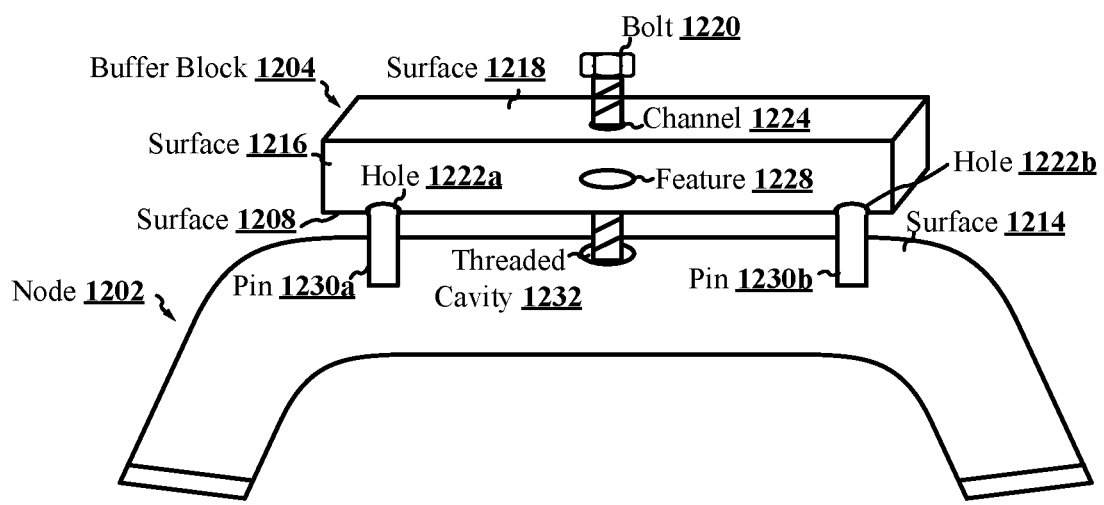
FIG. 12 illustrates a node in connection with a buffer block.

FIG. 12 shows a perspective view 1200 of a buffer block 1204. The buffer block 1204 may be configured to connect with a node 1202, as illustrated with respect to FIG. 12B. In an exemplary embodiment, the node 1202 is additively manufactured (e.g., using a 3-D printing apparatus, such as a PBF apparatus). The node 1202 may be additively manufacture for assembly. The node 1202 may be constructed from a plastic, metal, alloy, or any suitable material or combination thereof. The components of FIG. 12 are made transparent for clarity, although the components may or may not be partially or fully transparent in various applications. The node 1202 and/or the buffer block 1204 may be embodiments of other node(s) and/or buffer block(s), respectively, described in the present disclosure. In some embodiments, a supporting apparatus may be additionally included, as described in the present disclosure.

The buffer block 1204 may be configured with one at least one feature 1228 to be engaged by a robotic assembly or other automated constructor. The at least one feature 1228 may be disposed on a second surface 1216 of the buffer block 1204 that is different from a first surface 1208. According to various embodiments, the buffer block 1204 may have a plurality of features, including the at least one feature 1228, disposed thereon in order to connect with a plurality of different robotic assemblies and/or other automated constructors. Each of the plurality of features, including the at least one feature 1228, may enable a different robotic assembly and/or other automated constructor to engage with the buffer block 1204 to move the buffer block (and node, when attached thereto) throughout various assembly processes and/or post-processing operations. In one aspect, the at least one feature 1228 may be configured as zero-point features for a zero-point interface with the robotic assembly or other automated constructor.

In various embodiments, the buffer block 1204 may include a channel 1224. The channel 1224 may be a channel through the buffer block 1204, e.g., from a third surface 1218 to the first surface 1208. The channel 1224 may be configured to receive a bolt 1220, which may be disposed in the channel 1224—e.g., the channel 1224 may be threaded. The buffer block 1204 may receive the bolt so that a head of the bolt 1220 is disposed and accessible at the third surface 1218 of the buffer block 1204. Accordingly, a threaded portion of the bolt 1220 may extend away from the first surface 1208 and out of the channel 1224 at the first surface 1208.

Additionally, the buffer block 1204 may include a plurality of holes 1222*a-b*. The plurality of holes 1222*a-b* may be disposed on the first surface 1208 of the buffer block 1204. A first hole 1222*a* may be disposed on a first side of the channel 1224 at the first surface 1208 of the buffer block 1204, while a second hole 1222b may be disposed on a second side of the channel 1224 at the first surface 1208 of the buffer block 1204. The plurality of holes 1222a-b may be configured to receive pins having a relatively small clearance—e.g., smaller than the clearance of the bolt 1220 within the channel 1224.

The node 1202 may include a plurality of pins 1230a-b. The plurality of pins 1230a-b may be disposed on at least one surface 1214 of the node 1202, and may extend away from at least one surface 1214 of the node 1202. Additionally, the node 1202 may include a threaded cavity 1232, which may be disposed on the at least one surface 1214 of the node. The threaded cavity 1232 may be configured to receive the threaded portion of the bolt 1220.

The buffer block 1204 may connect with the node 1202 through the plurality of holes 1222a-b configured to receive the plurality of pins 1230a-b and through the bolt 1220 configured to be received by the threaded cavity 1232 disposed on the node 1202. The plurality of pins 1230a-b may be "male" features configured to "mate" with "female" receiving features (e.g., the plurality of holes 1222a-b) disposed on the buffer block 1204. Additionally, a head of the bolt 1220 may have a force (e.g., torque) applied thereto in order for the threaded portion of the bolt 1220 to be received within the threaded cavity 1232. Force may be applied to the head of the bolt 1220 in order for the threaded portion of the bolt 1220 to be received within the threaded cavity 1232 after the plurality of pins 1230a-b are positioned within the plurality of holes 1222a-b (e.g., to provide alignment). The force applied to the head of the bolt 1220 may be manual or automated.

Because the bolt 1220 within the threaded cavity 1232 may include some clearance, the plurality of pins 1230a-b positioned within the plurality of holes 1222a-b may rotational and/or translation movement of the node 1202 relative to the buffer block 1204 (e.g., because the plurality of pins 1230a-b positioned within the plurality of holes 1222a-b may have clearance that is less than the bolt 1220 within the threaded cavity 1232). Therefore, the plurality of pins 1230a-b may be zero-point features to provide a zero-point interface between the node 1202 and the buffer block 1204 when the plurality of pins 1230a-b are positioned within the plurality of holes 1222a-b. The bolt 1220 within the threaded cavity 1232 may form at least a portion of the rigid connection between the node 1202 and the buffer block 1204 (e.g., the plurality of pins 1230a-b positioned within the plurality of holes 1222a-b may contribute to the rigid connection).

Figure 13:
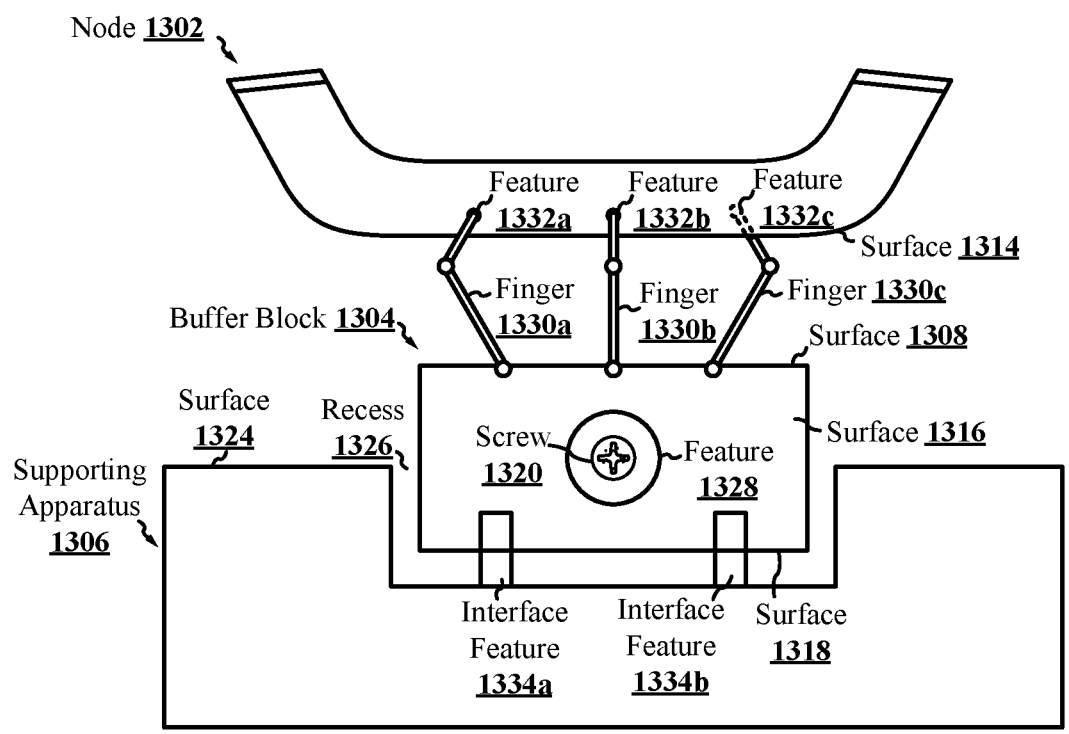
FIG. 13 illustrates a node in connection with a buffer block.

FIG. 13 shows a perspective views 1300 of a buffer block 1304. The buffer block 1304 may be configured to connect with a node 1302, as illustrated with respect to FIG. 13B. In an exemplary embodiment, the node 1302 is additively manufactured (e.g., using a 3-D printing apparatus, such as a PBF apparatus). The node 1302 may be additively manufacture for assembly. The node 1302 may be constructed from a plastic, metal, alloy, or any suitable material or combination thereof. The components of FIG. 13 are made transparent for clarity, although the components may or may not be partially or fully transparent in various applications. The node 1302 and/or the buffer block 1304 may be embodiments of other node(s) and/or buffer block(s), respectively, described in the present disclosure. In some embodiments, a supporting apparatus may be additionally included, as described in the present disclosure.

The buffer block 1304 may be configured with one at least one feature 1328 to be engaged by a robotic assembly or other automated constructor. The at least one feature 1328 may be disposed on a second surface 1316 of the buffer block 1304 that is different from a first surface 1308. According to various embodiments, the buffer block 1304 may have a plurality of features, including the at least one feature 1328, disposed thereon in order to connect with a plurality of different robotic assemblies and/or other automated constructors. Each of the plurality of features, including the at least one feature 1328, may enable a different robotic assembly and/or other automated constructor to engage with the buffer block 1304 to move the buffer block (and node, when attached thereto) throughout various assembly processes and/or post-processing operations. In one aspect, the at least one feature 1328 may be configured as zero-point features for a zero-point interface with the robotic assembly or other automated constructor.

In some embodiments, a supporting apparatus 1306 is included, in addition to the node 1302 and the buffer block 1304. In some embodiments, the supporting apparatus 1306 may be referred to as a block dock. The supporting apparatus 1306 may be configured to be connected with a table (e.g., a table of a mill, a table of a CNC machine, etc.).

The supporting apparatus 1306 may include a first surface 1324. The first surface 1324 may bound a recess 1326 formed in the supporting apparatus 1306. The buffer block 1304 may be at least partially disposed in the recess 1326, with the first surface 1308 of the buffer block 1304 facing away from the recess 1326 so that the plurality of fingers 1330a-c may extend away from the recess 1326 and engage with the one or more surfaces 1314 of the node 1302.

In some embodiments, at least a third surface 1318 of the buffer block 1304 may contact the first surface 1324 of the supporting apparatus 1306 within the recess 1326. The third surface 1318 of the buffer block 1304 and the first surface 1324 of the supporting apparatus 1306 may be connected via at least one or more interface features 1334a-b. The one or more interface features 1334a-b may form a rigid connection between the buffer block 1304 and the supporting apparatus 1306.

In one embodiment, the one or more interface features 1334a-b may provide a zero-point interface between the buffer block 1304 and the supporting apparatus 1306. For example, the buffer block 1304 may include one or more zero-point features (e.g., one or more interface features 1334a-b) with which the supporting apparatus 1306 is configured to engage to form the zero-point interface.

The buffer block 1304 may be connected with or may include a gripper, jaw, clamp, or other similar tool having a plurality of fingers 1330a-c at a first surface 1308 of the buffer block 1304. The plurality of fingers 1330a-c may extend away from the first surface 1308 of the buffer block 1304, e.g., toward a node. Although three fingers 1330a-c are illustrated, any number of fingers are comprehended by the present disclosure.

According embodiments, the plurality of fingers 1330a-c may engage with the node 1302. The plurality of fingers 1330a-c may engage with a plurality of features 1332a-c disposed on at least one surface 1314 of the node 1302. The plurality of features 1332a-c may be printed on the node or may be machined on the node 1302 after printing.

The plurality of features 1332a-c may be configured to receive the plurality of fingers 1330a-c. In the illustrated embodiment, the plurality of fingers 1330a-c may be male features configured to "mate" with the female receiver features 1332a-c of the node 1302. When the plurality of fingers 1330a-c engages with the plurality of features 1332a-c of the node 1302, a rigid connection may be formed between the buffer block 1304 and the node 1302. For example, the plurality of fingers 1330a-c may be in a fully closed position in order to engage with the receiver features 1332a-c and form the rigid connection.

In various embodiments, the plurality of fingers 1330a-c may be actuated by means of a screw 1320. In applying force to the screw 1320 in a first direction (e.g., clockwise), the plurality of fingers 1330a-c may be actuated to close, for example, until the plurality of fingers 1330a-c engage the receiver features 1332a-c of the node 1302 and form the rigid connection. In applying force to the screw 1320 in a second direction (e.g., counterclockwise), the plurality of fingers 1330a-c may be actuated to open, for example, to release the node 1302 and/or until the plurality of fingers 1330a-c are in a fully open position.

The screw 1320 may be disposed on a second surface 1316 of the buffer block 1304. In some embodiments, the screw 1320 may be positioned within the at least one feature 1328 that is configured to be engaged by a robotic assembly and/or other automated constructor. For example, a robotic assembly may engage with the at least one feature 1328 (e.g., for a zero-point interface between the buffer block 1304 and robotic assembly), and a screw mechanism disposed on the robotic assembly may apply force to the screw 1320 when the buffer block 1304 is connected with the robotic assembly.

Figure 14A:
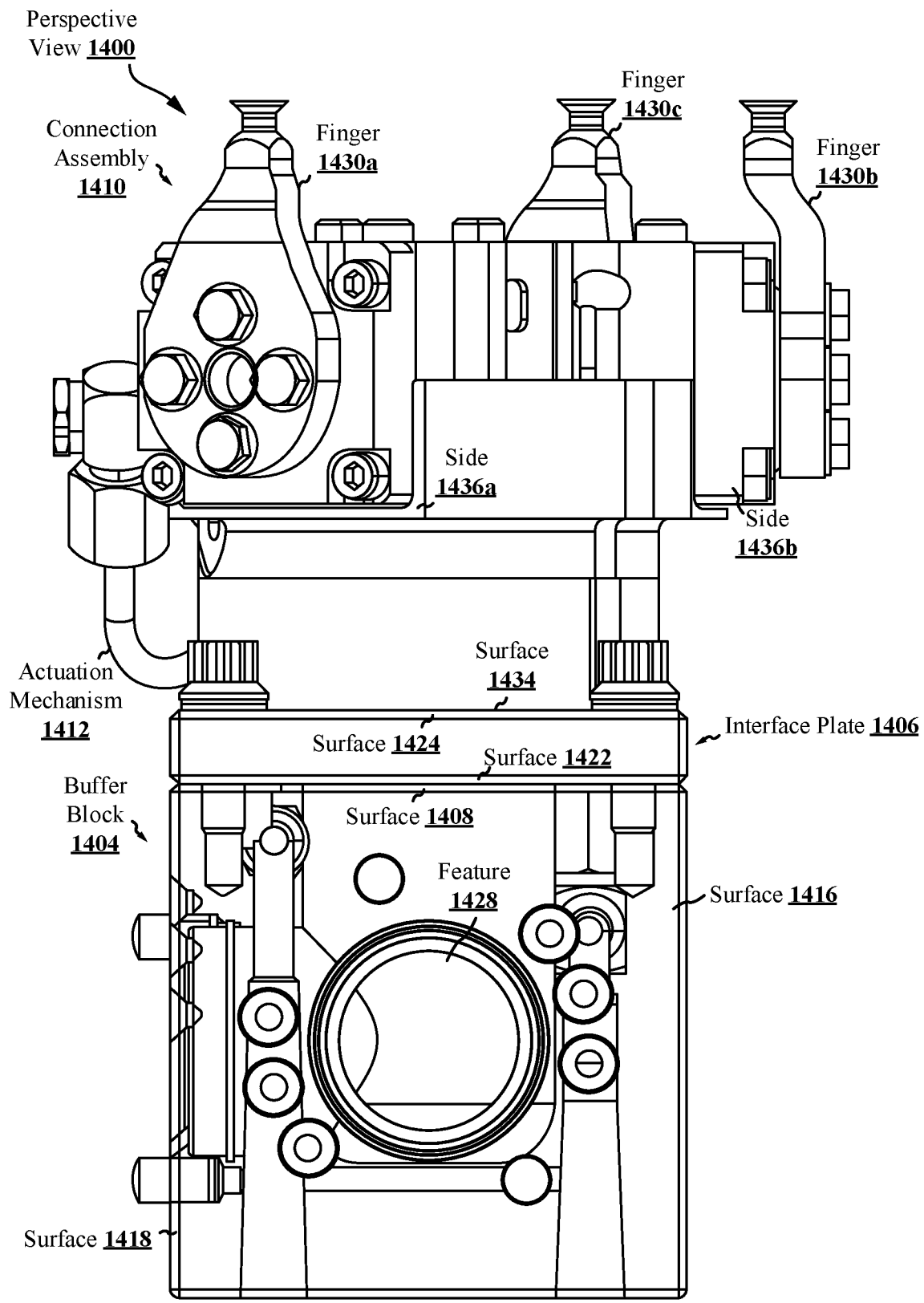
FIGS. 14A-C illustrates a buffer block and connection assembly.
Figure 14B:
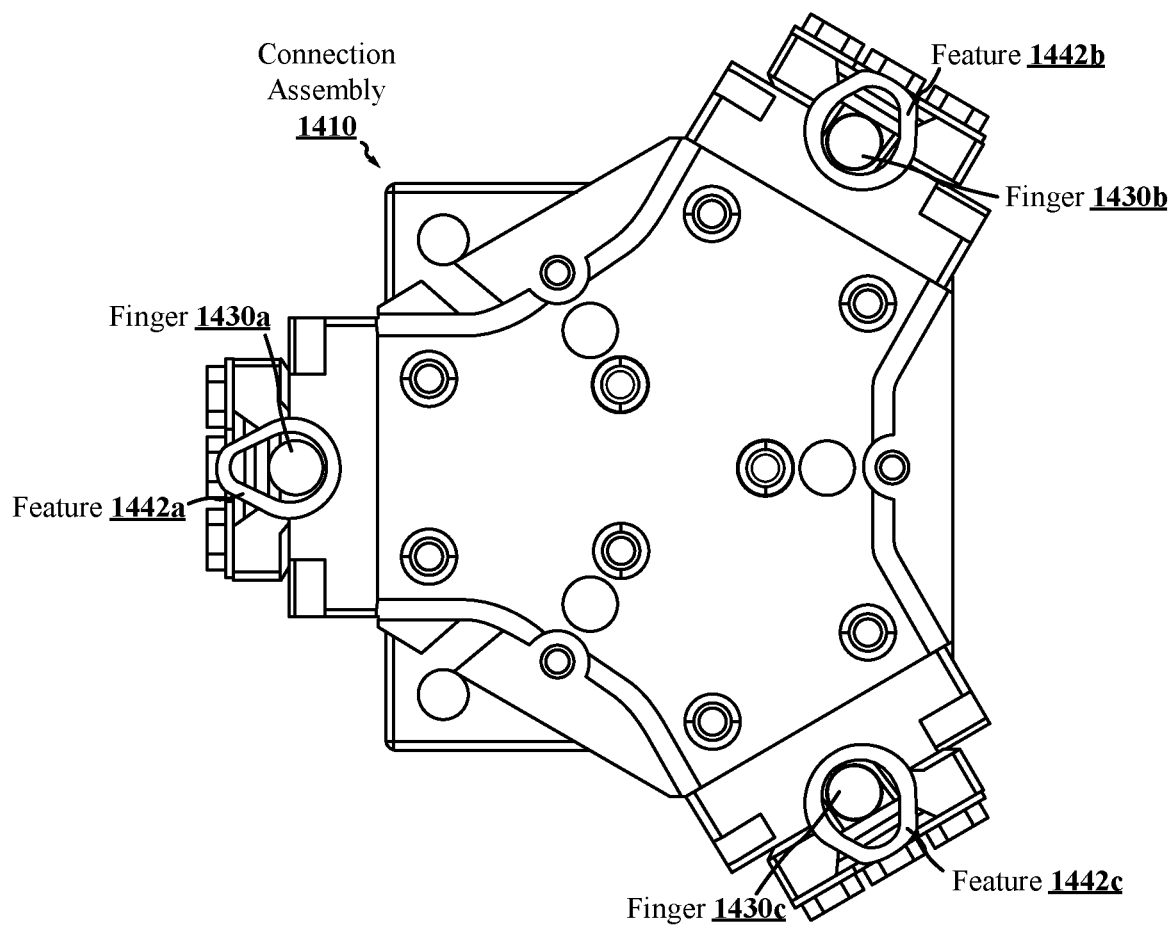
Figure 14C:
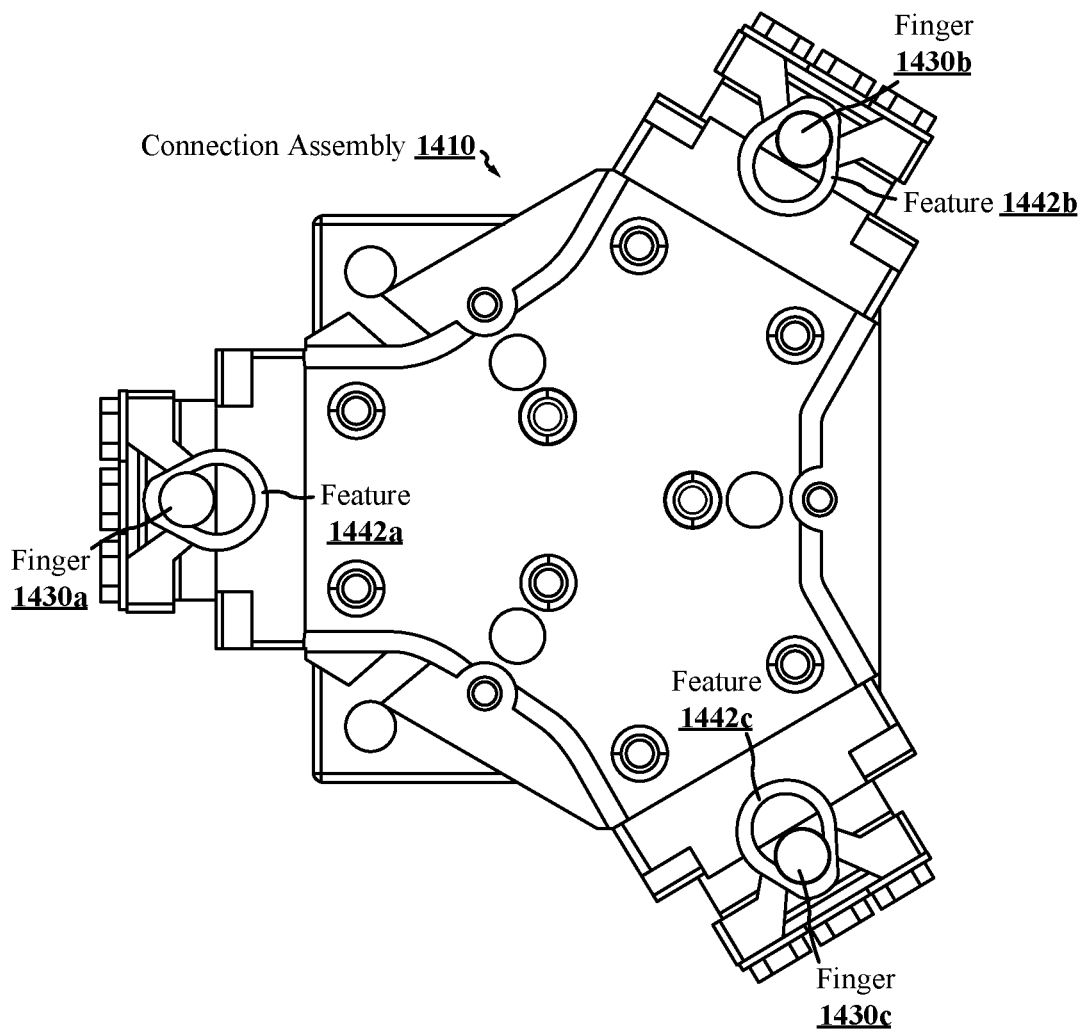

FIGS. 14A-C illustrate perspective views 1400, 1420, 1440 of a buffer block that may be configured to connect with a node. The components of FIG. 14 are made transparent for clarity, although the components may or may not be partially or fully transparent in various applications. The buffer block 1404 may be an embodiment of other buffer block(s) described in the present disclosure. In some embodiments, a supporting apparatus may be additionally included, as described in the present disclosure.

The buffer block 1404 may be configured with one at least one feature 1428 to be engaged by a robotic assembly or other automated constructor. The at least one feature 1428 may be disposed on a second surface 1416 of the buffer block 1404 that is different from a first surface 1408. According to various embodiments, the buffer block 1404 may have a plurality of features, including the at least one feature 1428, disposed thereon in order to connect with a plurality of different robotic assemblies and/or other automated constructors. Each of the plurality of features, including the at least one feature 1428, may enable a different robotic assembly and/or other automated constructor to engage with the buffer block 1404 to move the buffer block (and node, when attached thereto) throughout various assembly processes and/or post-processing operations. In one aspect, the at least one feature 1428 may be configured as zero-point features for a zero-point interface with the robotic assembly or other automated constructor.

In various embodiments, a robotic assembly and/or other automated constructor may connect with the buffer block 1404 through the at least one feature 1428. The robotic assembly and/or other automated constructor may then manipulate (e.g., translate and/or rotate) the buffer block 1404 and other components attached to the buffer block 1404, for example, including a node, a connection assembly, an interface plate, and/or other components described herein. When the buffer block 1404 is connected with a node, the robotic assembly and/or other automated constructor may move the buffer block 1404 so that a feature of the node that is to undergo a process or operation (e.g., machining) may be positioned to face an machine (e.g., mill, CNC machine, etc.). For example, the robotic assembly and/or other automated constructor may position the node and buffer block 1404 assembly so that the feature of the node is normal to a mill.

The buffer block 1404 may be connected with a connection assembly 1410, which may be disposed between the buffer block 1404 and the connection assembly 1410. In particular, a first surface 1408 of the buffer block 1404 may be connected with a first surface 1434 of the connection assembly 1410. In some aspects, the buffer block 1404 may be connected with the connection assembly 1410 via an interface plate 1406. Accordingly, the first surface 1408 of the buffer block 1404 may be connected with a first surface 1422 of the interface plate 1406, and the first surface 1434 of the connection assembly 1410 may be connected with a second surface 1424 of the interface plate 1406. In one example, the first surface 1422 of the interface plate 1406 faces away from the second surface 1424 of the interface plate 1406 (e.g., the first surface 1422 of the interface plate 1406 may be disposed on an opposite side of the interface plate 1406 from the second surface 1424 of the interface plate 1406). The interface plate 1406 may provide a zero-point interface between the buffer block 1404 and the connection assembly 1410.

The connection assembly 1410 may include a plurality of fingers 1430a-c. Although three fingers are illustrated, more or fewer fingers are comprehended by the present disclosure. The plurality of fingers 1430a-c may extend away from the first surface 1408 of the buffer block 1404, and may go extend beyond the area of the connection assembly 1410 so that a node may be engaged by the plurality of fingers 1430a-c.

Each of the plurality of fingers 1430a-c may be disposed on one or more sides 1436a-b of the connection assembly 1410, and the one or more sides 1436a-b may be surfaces that are different from the first surface 1434 of the connection assembly 1410. In one embodiment, each of the plurality of fingers 1430a-c may be bolted on to the sides 1436a-b of the connection assembly 1410.

The plurality of fingers 1430a-c may be configured to be actuated to engage a node. In one aspect, the plurality of fingers 1430a-c may laterally move (e.g., side-to-side movement) with respect to the first surface 1408 of the buffer block 1404 in order to engage a node (e.g., as described with respect to FIGS. 14C-B).

In one embodiment, the plurality of fingers 1430a-c may be configured to be actuated through an actuation mechanism 1412, which may be connected with or included on the buffer block 1404 and the connection assembly 1410. For example, the plurality of fingers 1430a-b may be pneumatically actuated. In one aspect, the actuation mechanism 1412 may be configured to carry an injectable substance to the connection assembly 1410, and the connection assembly 1410 may cause the injectable substance to actuate the plurality of fingers 1430a-c. Examples of injectable substances include air, hydraulic fluid, or a combination of injectable substances.

In one embodiment, the plurality of fingers 1430a-c may be spring-assisted or spring-actuated. For example, the plurality of fingers 1430a-c may be pneumatically actuated to engage a node, and the engagement position when actuated may be maintained through assistance from one or more springs. In another embodiment, the injectable substance may cause the plurality of fingers 1430a-c to be maintained in an engaged position when connected with the node.

In some embodiments, the buffer block 1404 may include one or more valves or channels configured to facilitate delivery of the injectable substance to actuate the plurality of fingers 1430*a-c*. The one or more valves and/or channels may be disposed on one or more surfaces of the buffer block 1404—e.g., a valve may have one opening or entry point disposed on a third surface 1418 of the buffer block 1404 and a channel may have one opening or entry point disposed on a second surface 1416 of the buffer block 1404. In some embodiments, the valve and/or the channel may traverse through the buffer block 1404 to have another opening or exit point at another surface of the buffer block 1404 (e.g., the first surface 1408 of the buffer block 1404). The buffer block 1404 may include a plurality of valves and/or a plurality of channels, for example, so that the buffer block 1404 may interface with various different connection assemblies having different techniques to engage a node.

In some embodiments, at least one valve and/or at least one channel included on the buffer block 1404 may be configured to be engaged by a robotic assembly and/or other automated constructor. For example, a robotic assembly may engage with at least one valve and/or at least one channel, and the robotic assembly may deliver an injectable substance through the at least one valve and/or channel. The injectable substance may be carried by the at least one valve and/or channel through the buffer block 1404 to the actuation mechanism 1412 to actuate the plurality of fingers 1430*a-c* when the buffer block 1404 is connected with the robotic assembly.

FIG. 14B illustrates a perspective view 1420 of the connection assembly 1410 when the plurality of fingers 1430*a-c* are unengaged with a node. A node may include a plurality of features 1442*a-c* (e.g., holes, cavities, grooves, etc.) that are configured to receive the plurality of fingers 1430*a-c*. For example, a robotic assembly may position the buffer block 1404 so that the plurality of fingers 1430*a-c* of the connection assembly 1410 are positioned within the plurality of features 1442*a-c* disposed on one or more surfaces of the node.

As shown in FIG. 14C, a perspective view 1440 illustrates the connection assembly 1410 when the plurality of fingers 1430*a-c* are engaged with a node. As described herein, the plurality of fingers 1430*a-c* may be actuated via an actuation mechanism 1412. Accordingly, each of the plurality of fingers 1430*a-c* may extend (e.g., travel laterally relative to the first surface 1408 of the buffer block 1404) in order to engage the node at each of the plurality of features 1442*a-c*. The plurality of fingers 1430*a-c* may cause force to be applied to the plurality of features 1442*a-c*, which may engage the node and form a rigid connection. In some embodiments, the plurality of fingers 1430*a-c* may be spring-assisted in order to maintain the rigid connection with the node, e.g., when a robotic assembly is moving the buffer block 1404 and connection assembly 1410 with the node connected therewith.

Figure 15:
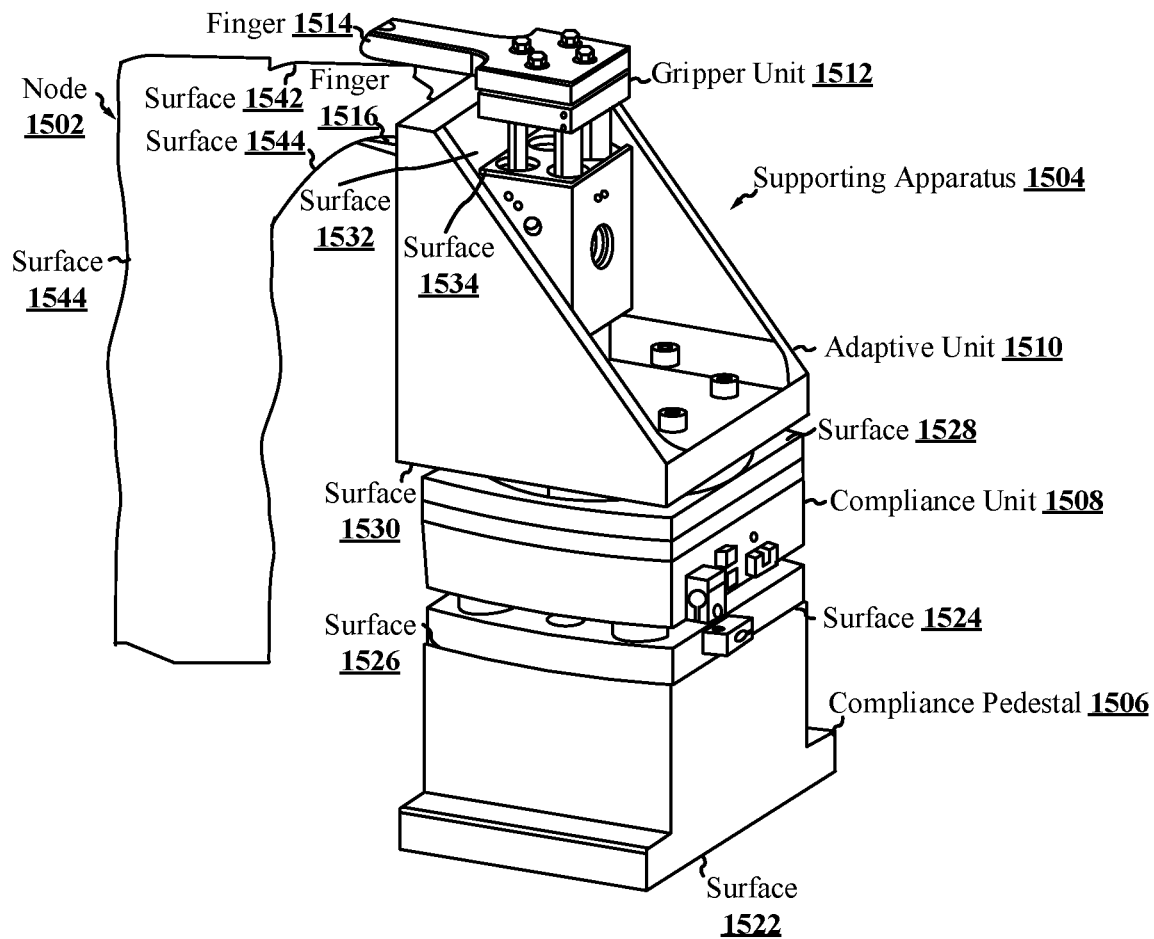
FIG. 15 illustrates a node in connection with a supporting apparatus.

FIG. 15 illustrates a perspective view 1500 of a supporting apparatus 1504 that is configured to support a node 1502. The components of FIG. 15 are made transparent for clarity, although the components may or may not be partially or fully transparent in various applications. The node 1502 and the supporting apparatus 1504 may be an embodiment of other node(s) and/or supporting apparatuses, respectively, described in the present disclosure. In some embodiments, a buffer block, robotic constructor, and/or other automated constructor may be additionally included, as described in the present disclosure.

The supporting apparatus 1504 may include a compliance pedestal 1506, which may be a base of the supporting apparatus 1504. The compliance pedestal 1506 may include a first surface 1522 that connects with another surface, e.g., in order to anchor the supporting apparatus 1504. For example, the first surface 1522 of the compliance pedestal 1506 may be connected with a base and/or table of an assembly and/or post-processing apparatus (e.g., a machining apparatus, a mill, etc.).

The compliance pedestal 1506 may include a second surface 1524. The second surface 1524 may face away from the first surface 1522 (e.g., the second surface 1524 may be disposed on an opposite side of the first surface 1522). The second surface 1524 of the supporting apparatus 1504 may be connected with a first surface 1526 of a compliance unit 1508.

The compliance unit 1508 may include a second surface 1528. The second surface 1528 may face away from the first surface 1526 (e.g., the second surface 1528 may be disposed on an opposite side of the first surface 1526). The second surface 1528 of the compliance unit 1508 may be connected with a first surface 1530 of an adaptive unit 1510.

The adaptive unit 1510 may be an adapter for a gripper, jaw, or other clamping mechanism. Therefore, at least a second surface 1532 of the adaptive unit 1510 may be connected with at least a first surface 1534 of a gripper unit 1512.

In various embodiments, the gripper unit 1512 may include at least a first finger 1514 and a second finger 1516, which may be configured to grip or clamp the node 1502 in order to secure or support the node 1502 for various assembly and/or post-processing operations. The first finger 1514 and the second finger 1516 may be configured to extend away from the second surface 1532 of the adaptive unit 1510. For example, the first finger 1514 and the second finger 1516 may be approximately parallel to a base and/or table with which the compliance pedestal 1506 is connected.

In one embodiment, the second finger 1516 may be fixed. That is, the second finger 1516 may be configured to remain in one position, and may not be actuated to move. The first finger 1514 may be configured to be actuated to move. For example, the first finger 1514 may be configured to be actuated to change position on an elevational plane (e.g., as opposed to an azimuthal plane). In other words, the first finger 1514 may be configured to be actuated to travel up and down relative to the base and/or table with which the compliance pedestal 1506 is connected.

A robotic assembly and/or other automated constructor may be configured to position the node 1502 so that at least a portion of the node 1502 is disposed between the first finger 1514 and the second finger 1516 (e.g., when the first finger 1514 is positioned in a relatively open position). For example, the robotic assembly may position the node 1502 by connecting with a buffer block and moving the buffer block and node 1502 assembly so that at least a portion of the node 1502 is disposed between the first finger 1514 and the second finger 1516. When disposed between the first finger 1514 and the second finger 1516, at least a second surface 1544 of the node 1502 may contact the second finger 1516.

When at least a portion of the node 1502 disposed between the first finger 1514 and the second finger 1516, the first finger 1514 may be actuated. For example, the first finger 1514 may be actuated to move along an elevational plane toward the second finger 1516. The first finger 1514 may be actuated to move to contact at least a first surface 1542 of the node 1502.

In positioning the node 1502 within the first finger 1514 and the second finger 1516, the supporting apparatus 1504 may be configured to be compliance, e.g., to prevent rotation and/or translation of the node 1502. For example, a position or location of the node 1502 may have been determined (e.g., via scanning or probing) and, therefore, the supporting apparatus 1504 may prevent rotational and/or translational movement of the node 1502 so that the determined position or location of the node 1502 (e.g., on the base or table of a machine) is unchanged (e.g., within a micron-level threshold). Thus, the determined position or location of the node 1502 may be used for assembly and/or post-processing operations, without the supporting apparatus 1504 affecting the position or location of the node 1502.

In order to provide the compliance, the supporting apparatus 1504 may be configured for both rotational compliance and translation compliance. In one embodiment, at least one of the compliance pedestal 1506 and/or the compliance unit 1508 is configured to provide translational compliance (e.g., so as to prevent deflection and/or translational movement of the node 1502). In one embodiment, at least one of the adaptive unit 1510 and/or the gripper unit 1512 is configured to provide the rotational compliance (e.g., so as to prevent deflection and/or rotational movement of the node 1502). The at least one of the adaptive unit 1510 and/or the gripper unit 1512 may include a ball joint in order to provide the rotational compliance.

Accordingly, the supporting apparatus 1504 may secure and/or support the node 1502 without causing unacceptable movement in any of six degrees of freedom. In some embodiments, a third surface of the node 1502 may be connected with a buffer block (e.g., as described herein). The buffer block may be connected with an robotic assembly and/or other automated constructor. The combination of the supporting apparatus 1504 with the buffer block may secure the node for one or more assembly and/or post-processing operations.

Figure 16:
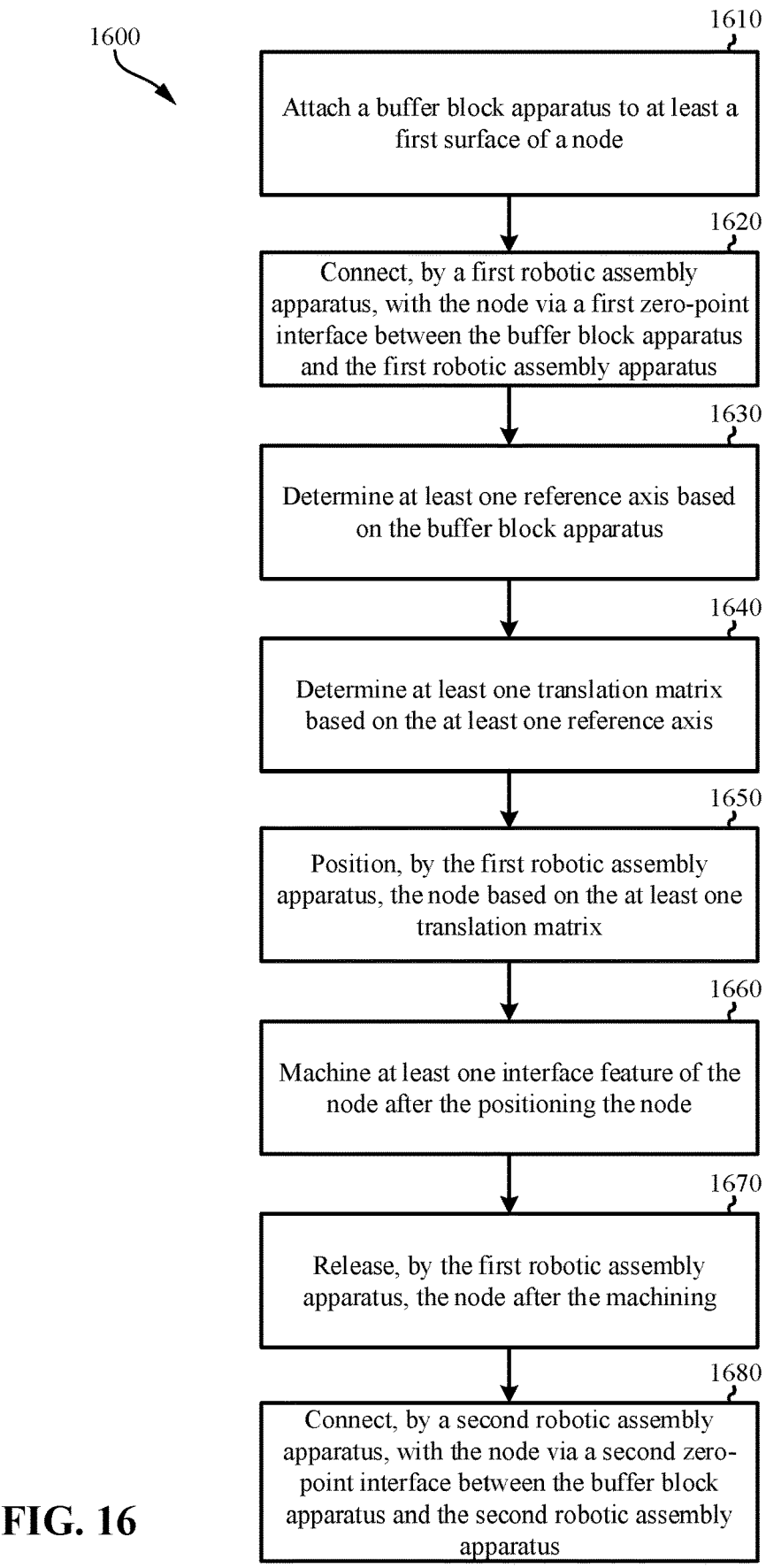
FIG. 16 is a flow diagram of an exemplary method of supporting a node.

FIG. 16 is a flow diagram of a method 1600 of securing a node for one or more assembly and/or post-processing operations. A buffer block apparatus may be attached to at least a first surface of the node (operation 1610). The buffer block apparatus may be connected with the node to form a first rigid connection.

A first robotic assembly apparatus may connect with the node via a first zero-point interface between the buffer block apparatus and the first robotic assembly apparatus (operation 1620).

At least one reference coordinate system may be determined based on the buffer block apparatus (operation 1630). For example, the buffer block apparatus may be scanned, separately from the node, to obtain the at least one reference coordinate system. In another example, the buffer block apparatus may be probed, separately from the node, to obtain the at least one reference coordinate system.

At least one translation matrix may be determined based on the at least one reference coordinate system (operation 1640). For example, the node may be scanned, after the buffer block apparatus is scanned, to obtain a position of the node with respect to the at least one reference coordinate system. In another example, the node may be probed, after the buffer block apparatus is probed, to obtain a position of the node with respect to the at least one reference coordinate system.

The first robotic assembly apparatus, connected with the node through the buffer block apparatus, may position the node based on the at least one translation matrix (operation 1650). At least one interface feature of the node may undergo one or more assembly and/or post-processing operations (e.g., machining) after the node is positioned (operation 1660). After the one or more assembly and/or post-processing operations, the first robotic assembly apparatus may release the node (operation 1670). A second robotic assembly apparatus may connect with the node via a second zero-point interface between the buffer block apparatus and the second robotic assembly (operation 1680).

Figure 17:
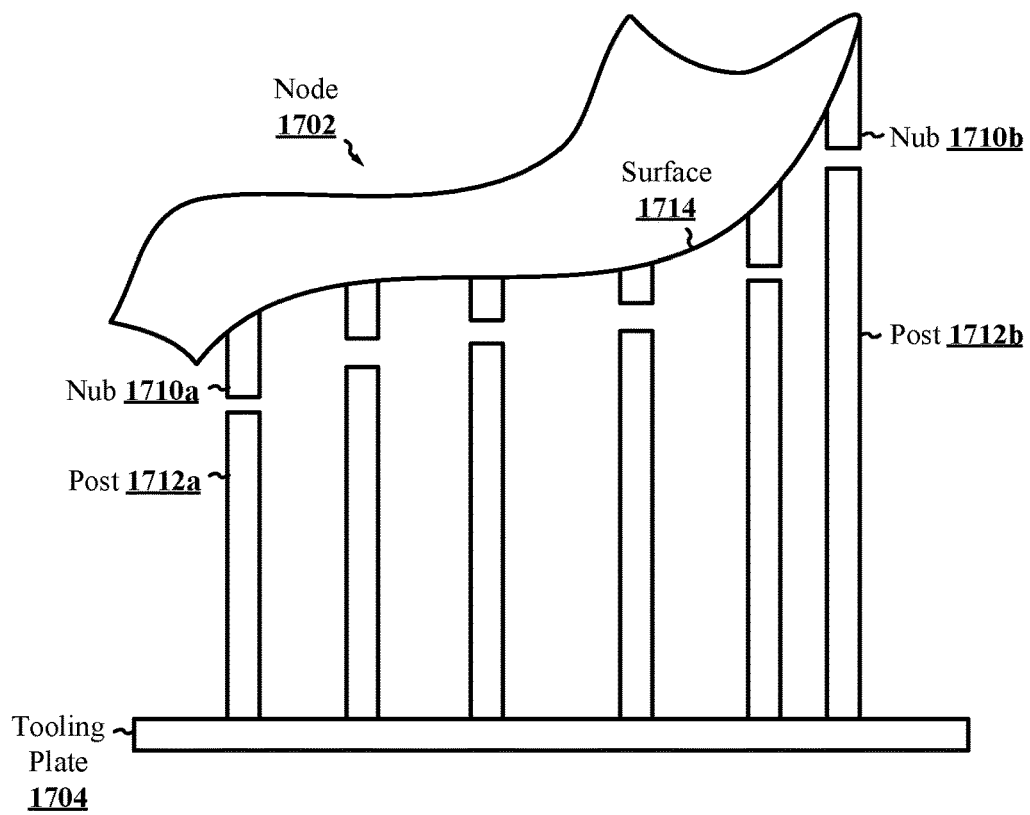
FIG. 17 illustrates a node in connection with a buffer block.

FIG. 17 illustrates a perspective view 1700 of a tooling plate 1704 that is configured to support a node 1702. The components of FIG. 17 are made transparent for clarity, although the components may or may not be partially or fully transparent in various applications. The node 1702 and the tooling plate 1704 may be an embodiment of other node(s) and/or supporting apparatuses, respectively, described in the present disclosure. In some embodiments, a buffer block, robotic constructor, and/or other automated constructor may be additionally included, as described in the present disclosure.

The node 1702 may include a plurality of nubs 1710*a-b*. The plurality of nubs 1710*a-b* may be connected with a respective surface 1714 of the node 1702, each of the plurality of nubs 1710*a-b* may extend away from the respective surface 1714 of the node 1702. In one embodiment, the plurality of nubs 1710*a-b* may be co-printed or additively manufactured with the node 1702. In another embodiment, the plurality of nubs 1710*a-b* may be attached to the node 1702 after the node 1702 is printed or additively manufactured (e.g., the plurality of nubs 1710*a-b* may be connected via mechanical means). The nubs 1710*a-b* may be disposed on one or more surfaces of the node 1702 so that one or more interface features of the node 1702 that are to undergo assembly and/or post-processing operations are accessible.

A tooling plate 1704 may include a plurality of support posts 1712*a-b*. The plurality of nubs 1710*a-b* may be complementary to the plurality of support posts 1712*a-b*. For example, the number of the plurality of nubs 1710*a-b* may be equal to the number of the plurality of support posts 1712*a-b* and/or a position of a respective one of each of the nubs 1710*a-b* may correspond to a position of a respective one of each of the support posts 1712*a-b*, e.g., so that the node 1702 may be connected with the tooling plate 1704 when the plurality of nubs 1710*a-b* are lined up with and connected with the plurality of support posts 1712*a-b*. In one embodiment, a respective one of each of the nubs 1710*a-b* may be adhered with a respective one of each of the support posts 1712*a-b* using an adhesive substance. The connection between the node 1702 and the tooling plate 1704 via the plurality of nubs 1710*a-b* connected with the plurality of support posts 1712*a-b* may provide support (e.g., a rigid connection) when one or more interface features of the node 1702 are to undergo assembly/post-processing operations.

Figure 18:
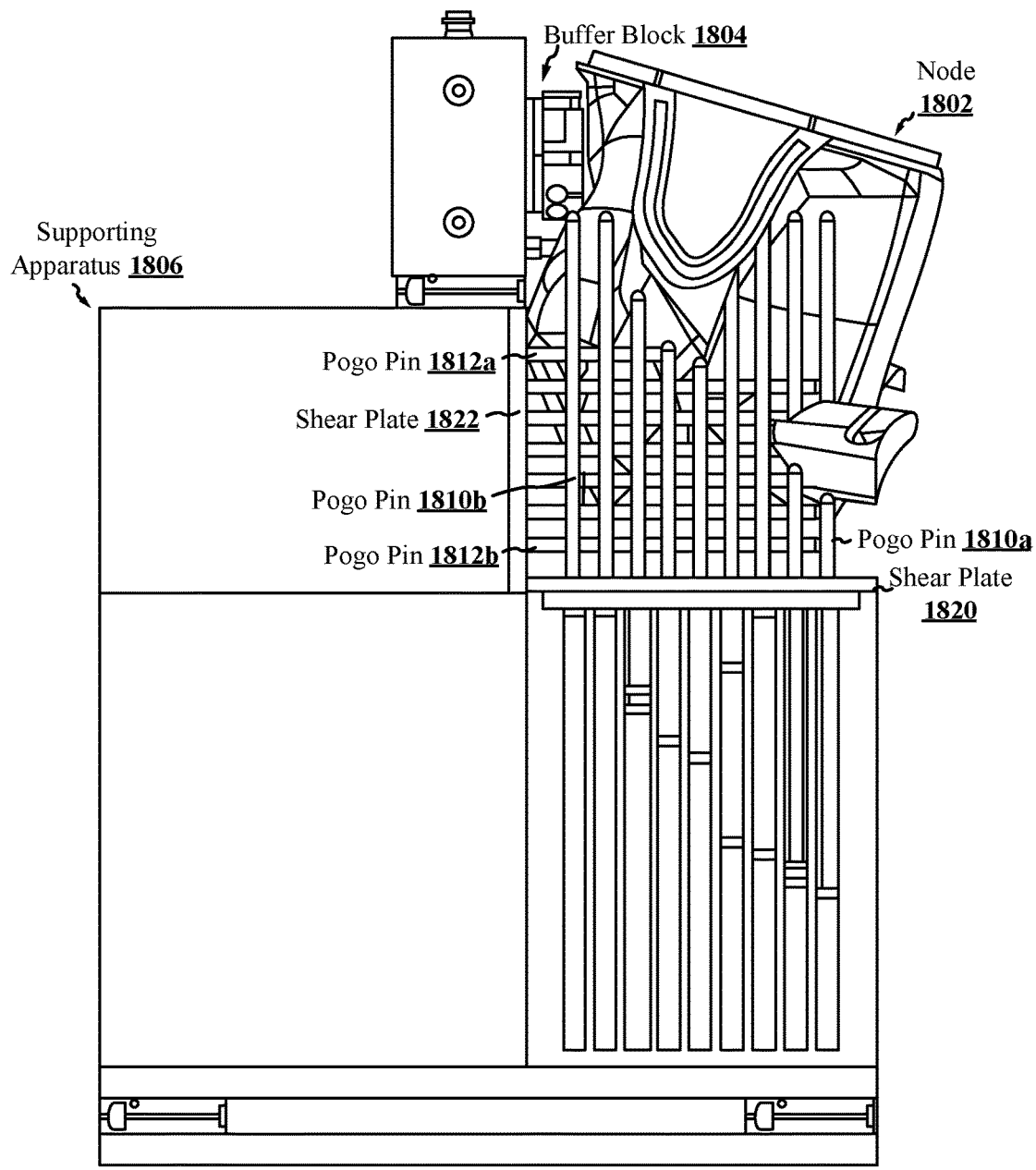
FIG. 18 illustrates a supporting apparatus supporting a node connected with a buffer block.

FIG. 18 illustrates a perspective view 1800 of a buffer block 1804 and supporting apparatus 1806 that is configured to support a node 1802. The components of FIG. 18 are made transparent for clarity, although the components may or may not be partially or fully transparent in various applications. The node 1802, buffer block 1804, and/or supporting apparatus 1806 may be an embodiment of other node(s), buffer block(s), and/or supporting apparatus(es), respectively, described in the present disclosure.

A buffer block 1804 may be connected with a node 1802. The buffer block 1804 may further be connected with a supporting apparatus 1806, which may be known as a block dock in some embodiments. As illustrated, the supporting apparatus 1806 may be connected with the node 1802. The assembly of the node 1802, buffer block 1804, and the supporting apparatus 1806 may be configured to fit within a CNC machine.

In various embodiments, the supporting apparatus 1806 may include a plurality of pogo pins 1810*a-b*, 1812*a-b*. The supporting apparatus 1806 may include a first plurality of pogo pins 1810a-b configured to extend in a first direction (e.g., relatively parallel to an elevational plane) and a second plurality of pogo pins 1812a-b configured to extend in a second direction (e.g., relatively perpendicular to the elevational plane). For example, the first plurality of pogo pins 1810a-b and the second plurality of pogo pins 1812a-b may be approximately perpendicular. The plurality of pogo pins 1810a-b, 1812a-b may be spring-assisted and/or spring-actuated.

The first plurality of pogo pins 1810a-b may extend from a first shear plate 1820, and the second plurality of pogo pins 1812a-b may extend from a second shear plate 1822. The shear plates 1820, 1822 may be configured to lock the first plurality of pogo pins 1810a-b and the second plurality of pogo pins 1812a-b, respectively, e.g., using a clamp (e.g., press-fit clamp). This may lock the plurality of pogo pins 1810a-b, 1812a-b in place without any axial forces (e.g., movement), and supports each of the plurality of pogo pins 1810a-b, 1812a-b.

In some embodiments, an additional top clamp may be included to clamp down on at least the first plurality of pogo pins 1810a-b at respective distal ends. The top clamp may be a pneumatic clamp.

Each of the plurality of pogo pins 1810a-b, 1812a-b may be configured to extend from a respective surface of the supporting apparatus, and extend away from that respective surface, e.g., in order to support the node 1802. Each of the plurality of pogo pins 1810a-b, 1812a-b may be configured to be actuated to extend away from the respective surface. Each of the plurality of pogo pins 1810a-b, 1812a-b may be configured to be actuated to a different position.

One or more of the plurality of pogo pins 1810a-b, 1812a-b may be actuated to contact the node 1802 at one or more surfaces that are relatively proximate to one or more interface features of the node 1802 that are to under assembly/post-processing operations (e.g., machining). Thus, the node 1802 may be supported in two different planes via the first plurality of pogo pins 1810a-b and the second plurality of pogo pins 1812a-b.

In various embodiments, a single node may connect to two or multiple structures using the features described above. The node may also be extended, elongated, or shaped in any way to enable multiple sets of interface regions (i.e., sets of one or more adhesive regions with sealants and channels as described above to realize a connection) to exist on a single node. For example, in one embodiment, the node is rectangular, with separate interfaces on two or more sides of the rectangular node connecting to different structures via the sealing and/or adhesive process and techniques described above. In other embodiments, the nodes may be constructed to have interface regions in close proximity so that two respective structures may be spaced very closely, or so that the structures may make contact. Numerous embodiments of the node, the structure, and/or the seal member(s) may be contemplated based on the present disclosure and attendant illustrations without departing from the spirit and scope of the present disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A buffer block apparatus for securing a node, the buffer block apparatus comprising:
    a first surface having disposed thereon at least one first feature configured for a first interface with a robotic assembly apparatus, the at least one first feature being highly accurate and repeatable and the at least one first interface being highly accurate and repeatable; and
    a second surface, different from the first surface, configured to connect with a first surface of a node and form a first rigid connection between the buffer block apparatus and the node,
    wherein the buffer block apparatus provides at least one reference coordinate system with respect to the node.

2. The buffer block apparatus of claim 1,
    wherein the second surface of the buffer block apparatus is directly connected with the first surface of the node.

3. The buffer block apparatus of claim 1,
    wherein the second surface of the buffer block apparatus is connected with the first surface of the node through at least one interface apparatus that is disposed between the second surface of the buffer block apparatus and the first surface of the node.

4. The buffer block apparatus of claim 1, wherein the at least one first feature is a zero-point feature and the first interface is a zero-point interface.

5. The buffer block apparatus of claim 1, wherein a third surface of the buffer block apparatus is connected with a first surface of a supporting apparatus and forms a second rigid connection between the buffer block apparatus and the supporting apparatus.

6. The buffer block apparatus of claim 5, wherein:
    the first surface of the supporting apparatus bounds a first recess in which at least a portion of the buffer block apparatus is disposed, and
    the first surface of the buffer block apparatus faces away from the first surface of the supporting apparatus.

7. The buffer block apparatus of claim 6, wherein:
    the buffer block apparatus includes a first plurality of fingers extending from the first surface of the buffer block apparatus,
    the first plurality of fingers are configured to engage with one or more surfaces of the node to form the first rigid connection between the buffer block apparatus and the node,
    the supporting apparatus includes a first plurality of pogo pins extending from the first surface of the supporting apparatus outside of the first recess, and
    the first plurality of pogo pins connect with the one or more surfaces of the node.

8. The buffer block apparatus of claim 6, wherein:
the first surface of the buffer block apparatus includes a first set of features configured to engage with a second set of features included on one or more surfaces of the node,
the engagement of the first set of features included on the first surface of the buffer block apparatus with the second set of features included on the one or more surfaces of the node forms a zero-point interface between the buffer block apparatus and the node,
the supporting apparatus includes a first plurality of support features extending from the first surface of the supporting apparatus outside of the first recess, and
the first plurality of support features connect with the one or more surfaces of the node proximate to a first plurality of locations on the first node at which the first node is to be machined.

9. The buffer block apparatus of claim 1, wherein:
the first surface of the buffer block apparatus includes a first plurality of programmable fingers extending away from the first surface of the buffer block apparatus,
each programmable finger of the first plurality of programmable fingers configured to be independently actuated to a respective position of a plurality of positions inclusively between a fully open position and a fully closed position, and
the first plurality of programmable fingers configured to engage with a first plurality of receiving features included on one or more surfaces of the node to form the first rigid connection.

10. The buffer block apparatus of claim 1, wherein:
the buffer block apparatus comprises a build plate having a center portion that is divided into a plurality of sections proximate to a center of the build plate,
each first surface of each section of the plurality of sections including a respective support feature extending away from each first surface of each section of the plurality of sections, and
the each respective support feature connected with a respective surface of the node to form the first rigid connection.

11. The buffer block apparatus of claim 10, wherein:
a distal end of the each respective support feature is connected with a first surface of a respective interface plate that is angled toward the node, and
each of the respective interface plates connects with the respective surface of the node.

12. The buffer block apparatus of claim 10, wherein:
the build plate comprises a second portion surrounding the center portion of the build plate, and
the build plate is unconnected with the node from the second portion surrounding the center portion.

13. The buffer block apparatus of claim 1, wherein:
the first surface of the buffer block apparatus includes a plurality of cavities,
a respective support feature extending from each cavity of the plurality of cavities, and
a respective distal end of each of the respective support features is configured to be connected with the node by a respective bolt that connects with a respective tab of a plurality of tabs included on one or more surfaces of the node.

14. The buffer block apparatus of claim 1, wherein:
the first surface of the buffer block apparatus includes a plurality of pins extending away from the first surface of the buffer block apparatus, and
each pin of the plurality of pins is configured to be received by a respective receiving feature disposed on a respective surface of the node to form a zero-point interface between the buffer block and the node.

15. The buffer block apparatus of claim 1, wherein
the first surface of the buffer block apparatus includes a channel configured to have a bolt disposed therein,
a threaded portion of the bolt extending away from the first surface of the buffer block apparatus and outside of the channel,
the threads of the bolt configured to be received by a threaded cavity of the node, and
the first surface of the buffer block includes a first hole disposed at a first side of the channel and a second hole disposed at a second side of the channel,
the first hole configured to receive a first pin disposed on the first surface of the node, and
the second hole configured to receive a second pin disposed on the first surface of the node.

16. The buffer block apparatus of claim 1, wherein
the first surface of the buffer block apparatus includes a plurality of fingers extending away from the first surface of the buffer block apparatus,
the plurality of fingers are configured to connect with one or more surfaces of the node, and
a third surface of the buffer block apparatus includes a screw configured to actuate the plurality of fingers to form the first rigid connection in response to force applied to the screw.

17. The buffer block apparatus of claim 1, wherein:
the second surface of the buffer block apparatus is connected with a first surface of a connection assembly configured to interface with one or more surfaces of the node via a plurality of fingers disposed on a plurality of surfaces of the connection assembly different from the first surface of the connection assembly, and
the buffer block apparatus includes an actuation mechanism configured to actuate the plurality of fingers forming the first rigid connection.

18. The buffer block apparatus of claim 17, wherein the actuation mechanism comprises:
at least one channel disposed on a third surface of the buffer block apparatus, wherein
the at least one channel is configured to carry an injectable substance to the connection assembly to actuate the plurality of fingers, and
the actuated plurality of fingers forming the first rigid connection.

19. The buffer block apparatus of claim 18, wherein the injectable substance comprises at least one of air or hydraulic fluid.

20. The buffer block apparatus of claim 17, wherein the second surface of the buffer block apparatus is connected with an interface plate disposed between the first surface of the buffer block apparatus and the first surface of the connection assembly.

* * * * *